United States Patent
Nakamura et al.

(10) Patent No.: US 10,681,231 B2
(45) Date of Patent: Jun. 9, 2020

(54) COMPUTER-READABLE MEDIUM, INFORMATION PROCESSING DEVICE, AND METHOD FOR CUSTOMIZING A SCREEN TO BE DISPLAYED ON A DISPLAY APPARATUS

(71) Applicant: BROTHER KOGYO KABUSHIKI KAISHA, Nagoya-shi, Aichi (JP)

(72) Inventors: Tomoki Nakamura, Kasugai (JP); Eriko Takahashi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/362,769

(22) Filed: Mar. 25, 2019

(65) Prior Publication Data
US 2019/0306346 A1    Oct. 3, 2019

(30) Foreign Application Priority Data
Mar. 30, 2018  (JP) .................................. 2018-067429

(51) Int. Cl.
*H04N 1/00*  (2006.01)
(52) U.S. Cl.
CPC ..... *H04N 1/00506* (2013.01); *H04N 1/00424* (2013.01); *H04N 1/00432* (2013.01); *H04N 1/00474* (2013.01); *H04N 2201/0094* (2013.01)
(58) Field of Classification Search
CPC .......... H04N 1/00506; H04N 1/00474; H04N 1/00424
See application file for complete search history.

(56) References Cited

U.S. PATENT DOCUMENTS

| | | | | |
|---|---|---|---|---|
| 2011/0060994 | A1* | 3/2011 | Maxwell | G06F 3/147 715/730 |
| 2014/0082506 | A1* | 3/2014 | Maxwell | G06F 3/147 715/738 |
| 2016/0028907 | A1* | 1/2016 | Kato | H04N 1/00514 358/1.13 |
| 2016/0328123 | A1* | 11/2016 | Toda | H04N 1/00474 |

FOREIGN PATENT DOCUMENTS

| JP | 2011-154474 A | | 8/2011 |
|---|---|---|---|
| JP | 2011154474 A | * | 8/2011 |

* cited by examiner

*Primary Examiner* — Ted W Barnes
(74) *Attorney, Agent, or Firm* — Scully, Scott, Murphy & Presser, PC

(57) ABSTRACT

A non-transitory computer-readable medium stores computer-readable instructions that are executable by a processor coupled with an information processing device, the instructions being configured to, when executed by the processor, display a new-icon setting screen including a setting frame, one or more screen setting parts, and one or more operation setting parts, the setting frame having a screen setting area and an operation setting area that extend along a time axis sectioned into a plurality of time frames, accept an operation of setting each screen setting part into a corresponding one of the time frames within the screen setting area, accept an operation of setting each operation setting part into a corresponding one of the time frames within the operation setting area, generate processing data associated with a new icon, in accordance with each setting part set in the setting frame, and transmit the generated processing data to a display apparatus.

11 Claims, 13 Drawing Sheets

COMPUTER-READABLE MEDIUM, INFORMATION PROCESSING DEVICE, AND METHOD FOR CUSTOMIZING A SCREEN TO BE DISPLAYED ON A DISPLAY APPARATUS

CROSS-REFERENCE TO RELATED APPLICATION

This application claims priority under 35 U.S.C. § 119 from Japanese Patent Application No. 2018-067429 filed on Mar. 30, 2018. The entire subject matter of the application is incorporated herein by reference.

BACKGROUND

Technical Field

Aspects of the present disclosure are related to a non-transitory computer-readable medium, an information processing device, and a method for customizing a screen to be displayed on a display apparatus separate from the information processing device.

Related Art

A technology to customize, on an information processing device, a screen to be displayed on a display of an image processing apparatus (e.g., a printer) has been known. More specifically, in the known technology, one or more previously-prepared UI parts may be added onto the screen by a drag-and-drop operation of the one or more UI parts.

SUMMARY

It would be convenient if a user could easily set, for each of the added one or more UI parts, a specific operation to be executed by the image processing apparatus and/or a corresponding screen to be displayed during execution of the specific operation. In particular, it would be more helpful if the user could easily and flexibly set, for each single UI part, a plurality of kinds of operations to be serially executed by the image processing apparatus and/or a plurality of screens to be serially displayed in accordance with which operation is in execution among the plurality of kinds of operations.

Aspects of the present disclosure are advantageous to provide one or more improved techniques for easily and flexibly customizing, on an information processing device, one or more operations to be executed on a display apparatus and a screen to be displayed thereon during execution of each individual operation.

According to aspects of the present disclosure, a non-transitory computer-readable medium is provided, which stores computer-readable instructions that are executable by a processor coupled with an information processing device. The information processing device includes a display, an input interface, and a communication interface configured to communicate with a display apparatus. The display apparatus is configured to display an icon screen including one or more icons thereon, in accordance with icon data for each icon, each piece of icon data including image data representing a corresponding icon and processing data associated with the corresponding icon, and when an icon is selected from among the one or more icons on the icon screen, display one or more corresponding screens and perform one or more corresponding operations in accordance with the processing data associated with the selected icon. The instructions are configured to, when executed by the processor, cause the processor to accept, via the input interface, an icon adding operation to request adding a new icon onto the icon screen, in response to accepting the icon adding operation, control the display to display a new-icon setting screen, the new-icon setting screen including a setting frame, one or more screen setting parts, and one or more operation setting parts, the setting frame having a screen setting area and an operation setting area that extend along a time axis sectioned into a plurality of time frames, each screen setting part being associated with a screen content representing a specific screen that is set to be displayed on the display apparatus in response to the new icon being selected via the icon screen, each operation setting part being associated with an operation content representing a specific operation that is set to be performed on the display apparatus in response to the new icon being selected via the icon screen, accept, via the input interface, a screen-part setting operation of setting each of the one or more screen setting parts into a corresponding one of the time frames within the screen setting area, accept, via the input interface, an operation-part setting operation of setting each of the one or more operation setting parts into a corresponding one of the time frames within the operation setting area, generate specific processing data associated with the new icon, based on the screen content associated with each screen setting part set in the setting frame and on the operation content associated with each operation setting part set in the setting frame, the specific processing data being configured to, when the new icon is selected via the icon screen, cause the display apparatus to serially display each specific screen represented by the screen content associated with a corresponding one of the one or more screen setting parts in a same order as the one or more screen setting parts are arranged along the time axis while serially performing each specific operation represented by the operation content associated with a corresponding one of the one or more operation setting parts in a same order as the one or more operation setting parts are arranged along the time axis, and transmit specific icon data for the new icon to the display apparatus via the communication interface, the specific icon data including the specific processing data.

According to aspects of the present disclosure, further provided is an information processing device including a controller, a display, an input interface, and a communication interface configured to communicate with a display apparatus. The display apparatus is configured to display an icon screen including one or more icons thereon, in accordance with icon data for each icon, each piece of icon data including image data representing a corresponding icon and processing data associated with the corresponding icon, and when an icon is selected from among the one or more icons on the icon screen, display one or more corresponding screens and perform one or more corresponding operations in accordance with the processing data associated with the selected icon. The controller is configured to accept, via the input interface, an icon adding operation to request adding a new icon onto the icon screen, in response to accepting the icon adding operation, control the display to display a new-icon setting screen, the new-icon setting screen including a setting frame, one or more screen setting parts, and one or more operation setting parts, the setting frame having a screen setting area and an operation setting area that extend along a time axis sectioned into a plurality of time frames, each screen setting part being associated with a screen content representing a specific screen that is set to be displayed on the display apparatus in response to the new icon being selected via the icon screen, each operation setting part being associated with an operation content representing a specific operation that is set to be performed on the display apparatus in response to the new icon being selected via the icon screen, accept, via the input interface, a screen-part setting operation of setting each of the one or more screen setting parts into a corresponding one of the time frames within the screen setting area, accept, via the input interface, an operation-part setting operation of setting each of the one or more operation setting parts into a corresponding one of the time frames within the operation setting area, generate specific processing data associated with the new icon, based on the screen content associated with each screen setting part set in the setting frame and on the operation content associated with each operation setting part set in the setting frame, the specific processing data being configured to, when the new icon is selected via the icon screen, cause the display apparatus to serially display each specific screen represented by the screen content associated with a corresponding one of the one or more screen setting parts in a same order as the one or more screen setting parts are arranged along the time axis while serially performing each specific operation represented by the operation content associated with a corresponding one of the one or more operation setting parts in a same order as the one or more operation setting parts are arranged along the time axis, and transmit specific icon data for the new icon to the display apparatus via the communication interface, the specific icon data including the specific processing data.

According to aspects of the present disclosure, further provided is a method implementable on a processor coupled with an information processing device. The information processing device includes a display, an input interface, and a communication interface configured to communicate with a display apparatus. The display apparatus is configured to display an icon screen including one or more icons thereon, in accordance with icon data for each icon, each piece of icon data including image data representing a corresponding icon and processing data associated with the corresponding icon, and when an icon is selected from among the one or more icons on the icon screen, display one or more corresponding screens and perform one or more corresponding operations in accordance with the processing data associated with the selected icon. The method includes accepting, via the input interface, an icon adding operation to request adding a new icon onto the icon screen, in response to accepting the icon adding operation, controlling the display to display a new-icon setting screen, the new-icon setting screen including a setting frame, one or more screen setting parts, and one or more operation setting parts, the setting frame having a screen setting area and an operation setting area that extend along a time axis sectioned into a plurality of time frames, each screen setting part being associated with a screen content representing a specific screen that is set to be displayed on the display apparatus in response to the new icon being selected via the icon screen, each operation setting part being associated with an operation content representing a specific operation that is set to be performed on the display apparatus in response to the new icon being selected via the icon screen, accepting, via the input interface, a screen-part setting operation of setting each of the one or more screen setting parts into a corresponding one of the time frames within the screen setting area, accepting, via the input interface, an operation-part setting operation of setting each of the one or more operation setting parts into a corresponding one of the time frames within the operation setting area, generating specific processing data associated with the new icon, based on the screen content associated with each screen setting part set in the setting frame and on the operation content associated with each operation setting part set in the setting frame, the specific processing data being configured to, when the new icon is selected via the icon screen, cause the display apparatus to serially display each specific screen represented by the screen content associated with a corresponding one of the one or more screen setting parts in a same order as the one or more screen setting parts are arranged along the time axis while serially performing each specific operation represented by the operation content associated with a corresponding one of the one or more operation setting parts in a same order as the one or more operation setting parts are arranged along the time axis, and transmitting specific icon data for the new icon to the display apparatus via the communication interface, the specific icon data including the specific processing data.

BRIEF DESCRIPTION OF THE ACCOMPANYING DRAWINGS

FIG. 1 is a block diagram schematically showing a configuration of an information processing system in an illustrative embodiment according to one or more aspects of the present disclosure.

FIG. 2 exemplifies a standby screen to be displayed on a display of an image processing apparatus included in the information processing system in the illustrative embodiment according to one or more aspects of the present disclosure.

FIG. 3 exemplifies a main screen to be displayed on a display of an information processing device included in the information processing system in the illustrative embodiment according to one or more aspects of the present disclosure.

FIG. 4 exemplifies an additional-icon selecting screen to be displayed on the display of the information processing device in the illustrative embodiment according to one or more aspects of the present disclosure.

FIG. 5 exemplifies a custom-function creating screen to be displayed on the display of the information processing device in the illustrative embodiment according to one or more aspects of the present disclosure.

FIGS. 6 to 8 show respective different examples in which setting parts are set on the custom-function creating screen, in the illustrative embodiment according to one or more aspects of the present disclosure.

FIG. 9 exemplifies the main screen onto which a new icon is added, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

[Illustrative Embodiment]

(1) General Overview of Information Processing System

Figure 1:
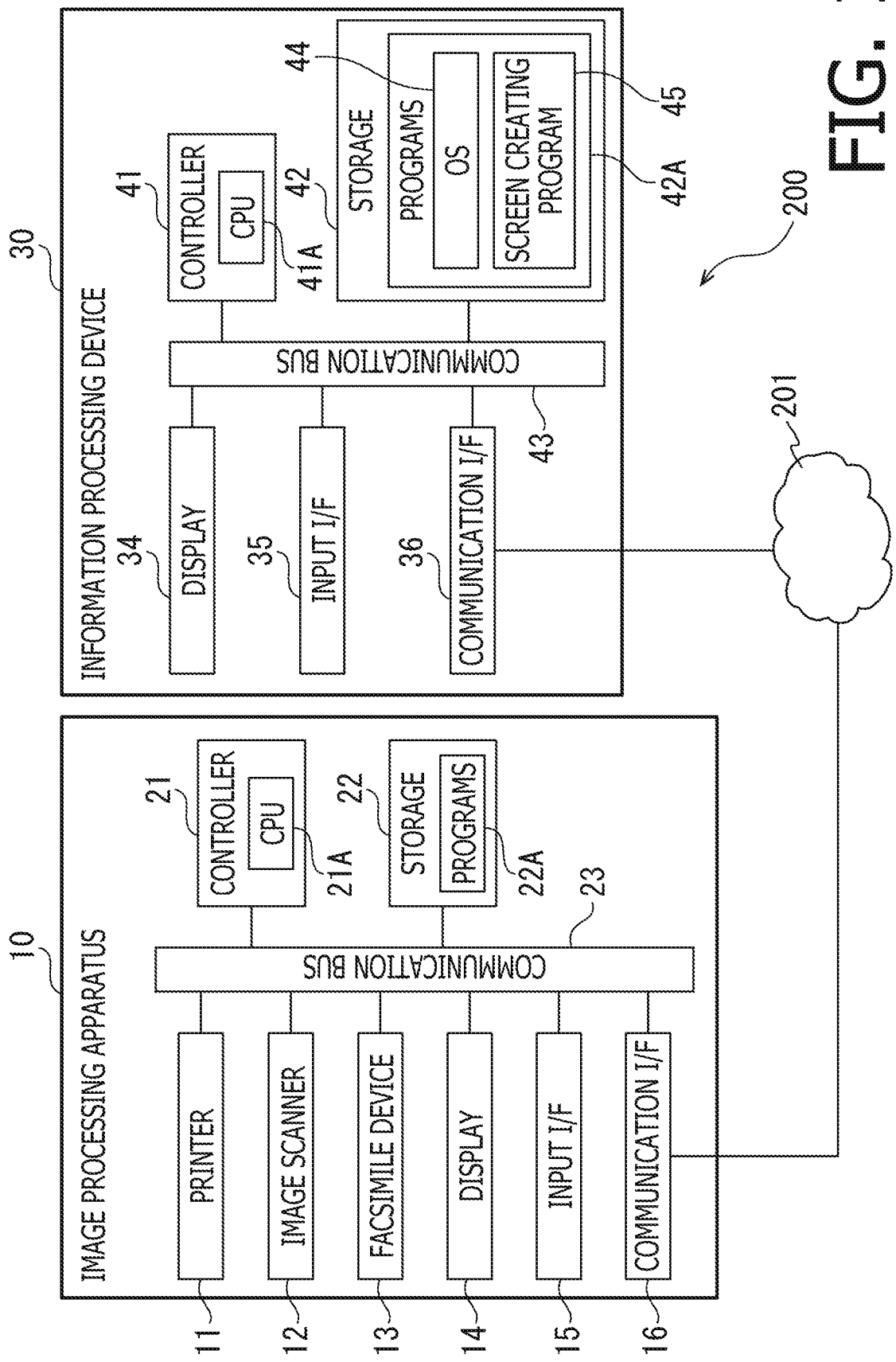

As shown in FIG. 1, an information processing system 200 of the illustrative embodiment includes an image processing apparatus 10 and an information processing device 30. The image processing apparatus 10 and the information processing device 30 are communicably connected with each other via a communication network 201. For instance, the communication network 201 may be, but not limited to, the Internet, a wired LAN, a wireless LAN, or a combination of at least two of them. Further, for instance, the image processing apparatus 10 and the information processing device 30 may be mutually communicable via communication media (e.g., a USB cable) according to various communication standards.

(2) Configuration of Image Processing Apparatus

As shown in FIG. 1, the image processing apparatus 10 includes a printer 11, an image scanner 12, a facsimile device 13, a display 14, an input I/F ("I/F" is an abbreviation of "interface") 15, a communication I/F 16, a controller 21, and a storage 22. The aforementioned elements included in the image processing apparatus 10 are interconnected via a communication bus 23. The image processing apparatus 10 may have a plurality of basic functions such as a printing function, a scanning function, a facsimile function, and a copy function.

The printer 11 provides the printing function. The printer 11 is configured to form an image based on image data on a sheet-shaped printing medium in an inkjet method or an electrophotographic method, using a printing mechanism thereof.

The image scanner 12 provides the scanning function. The image scanner 12 is configured to scan an image of a document sheet by an image sensor and generate image data of the scanned image.

The facsimile device 13 provides the facsimile function. The facsimile device 13 is configured to transmit facsimile data to one or more external devices and receive facsimile data from the one or more external devices.

The communication I/F 16 is configured to communicate with the one or more external devices via the communication network 201. The display 14 includes a display device configured to display an image thereon. For instance, the display device may be, but not limited to, an LCD device or an organic EL display device.

The input I/F 15 includes one or more input devices, such as one or more hard keys and a touch panel, configured to accept various types of input operations. The touch panel may be overlaid on a display area of the display 14.

The touch panel is an input device configured to detect an indicating operation to indicate a particular position in the display area of the display 14 with an indicator such as a finger, a touch pen, and a stylus. Examples of the "indicating operation" may include, but are not limited to, bringing the indicator in contact with or proximity to the particular position. The touch panel is further configured to, when the indicating operation is performed, output a detection signal representing the particular position indicated by the indicator.

Based on the detection signal output from the touch panel, the controller 21 detects (determines) whether the indicating operation has been performed, and detects where has been indicated by the indicator in response to detecting (determining) that the indicating operation has been performed. Further, based on those detection results, the controller 21 detects what type of user operation is the performed indicating operation. For instance, detectable types of user operations may include, but are not limited to, tapping, dragging, dragging and dropping, flicking, pinching in, and pinching out.

For instance, the controller 21 may include a CPU 21A. The controller 21 is configure to control operations of each element included in the image processing apparatus 10, thereby implementing the aforementioned functions such as the printing function, the scanning function, the facsimile function, and the copy function.

For instance, the storage 22 may include semiconductor memories such as a ROM, a RAM, an NVRAM, and a flash memory. Namely, the image processing apparatus 10 is provided with a microcomputer including the CPU 21A and the semiconductor memories. The storage 22 stores various programs 22A and various kinds of data. Although the storage 22 is shown as an element separate from the controller 21 in FIG. 1, the storage 22 may be included in the controller 21. Namely, the controller 41 may include the CPU 21A and the storage 22 storing the programs 22A executable by the CPU 21A.

The controller 21 may implement the aforementioned functions by executing the various programs 22A stored in the storage 22. Each function implementable by the controller 21 may not necessarily be implemented by executing one or more programs 22A, but may entirely or partially be implemented by using one or more hardware elements.

Figure 2:
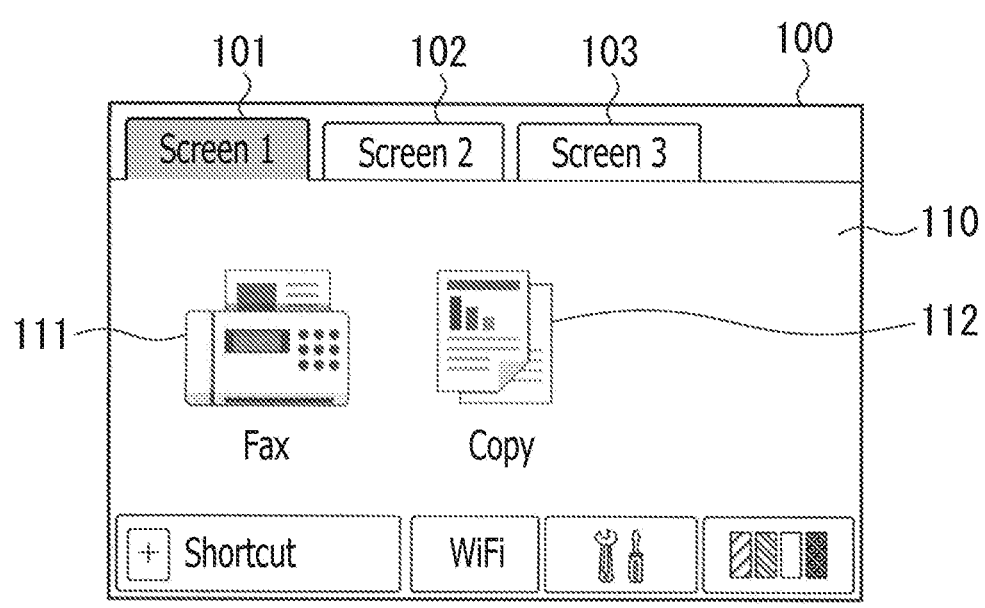

The controller 21 may cause the display to display various screens such as a standby screen 100. The controller 21 performs a particular initializing process after being activated, and thereafter causes the display 14 to display the standby screen 100. FIG. 2 exemplifies the standby screen 100 to be displayed on the display 14.

As exemplified in FIG. 2, the standby screen 100 includes a plurality of icons such as a facsimile icon 111 and a copy icon 112. Further, the standby screen 100 is a tabbed-form screen including a plurality of tabs 101, 102, and 103 each of which is set in association with an individual tab screen. FIG. 2 shows an example in which the tab 101 is selected, and a tab screen 110 associated with the tab 101 is displayed.

The standby screen 100 is displayed in accordance with screen data stored in the storage 22. The screen data includes a plurality of pieces of icon data associated with the plurality of icons to be displayed on the standby screen 100. The controller 21 causes the display 14 to display the plurality of icons on the standby screen 100 in accordance with the plurality of pieces of icon data included in the screen data, respectively.

Each piece of icon data includes image data representing a corresponding icon, and processing data. The processing data represents various kinds of processes to be performed when the corresponding icon is selected (e.g., tapped). The processing data includes data for operations to be executed, and data for a corresponding screen to be displayed on the display 14 during execution of each individual operation. In response to an icon on the standby screen 100 being selected, the controller 21 of the image processing apparatus 10 controls the display 14 to display a corresponding screen and performs one or more corresponding operations in accordance with the processing data associated with the selected icon.

(3) Configuration of Information Processing Device

The information processing device 30 may be an information processing terminal such as a personal computer, a tablet terminal, and a smartphone. As shown in FIG. 1, the information processing device 30 includes a display 34, an input I/F 35, a communication I/F 36, a controller 41, and a storage 42, which are interconnected via a communication bus 43.

The controller 41 may include a CPU 41A. The storage 42 may include semiconductor memories such as a ROM, a RAM, an NVRAM, and a flash memory. Namely, the information processing device 30 of the illustrative embodiment is provided with a microcomputer including the CPU 41A and the semiconductor memories. Although the storage 42 is shown as an element separate from the controller 41 in FIG. 1, the storage 42 may be included in the controller 41. Namely, the controller 41 may include the CPU 41A and the storage 42 storing programs 42A executable by the CPU 41A.

The controller 41 (more specifically, the CPU 41A) may be configured to execute the programs 42A stored in the storage 42 as a non-transitory computer-readable storage medium, thereby implementing various functions of the information processing device 30. Nonetheless, each function implementable by the controller 41 may not necessarily be implemented by executing one or more programs 42A, but may be entirely or partially be implemented by using one or more hardware elements.

The storage 42 stores various kinds of software and data. In the illustrative embodiment, at least an OS ("OS" is an abbreviation of "operating system") and a screen creating program 45 are stored as software in the storage 42. The screen creating program 45 is for customizing the standby screen 100 to be displayed on the image processing apparatus 10.

In the following description, the controller 41 (more specifically, the CPU 41A) executing a specific one of the programs 42A may be simply referred to as a name of the specific program 42A. For instance, what is simply expressed as "the screen creating program 45" may denote "the CPU 41 executing the screen creating program 45."

The display 34 includes a display device configured to display an image thereon. For instance, the display device may be, but not limited to, an LCD device or an organic EL display device. The input I/F 35 includes one or more input devices, such as a keyboard, a mouse, and a touch panel, configured to accept various types of input operations. The touch panel may be overlaid on a display area of the display 34.

The communication I/F 36 is configured to communicate with one or more external devices. The information processing device 30 may communicate with one or more image processing apparatuses including the image processing apparatus 10 shown in FIG. 1, via the communication I/F 36.

(4) Explanation of Main Screen

Figure 3:
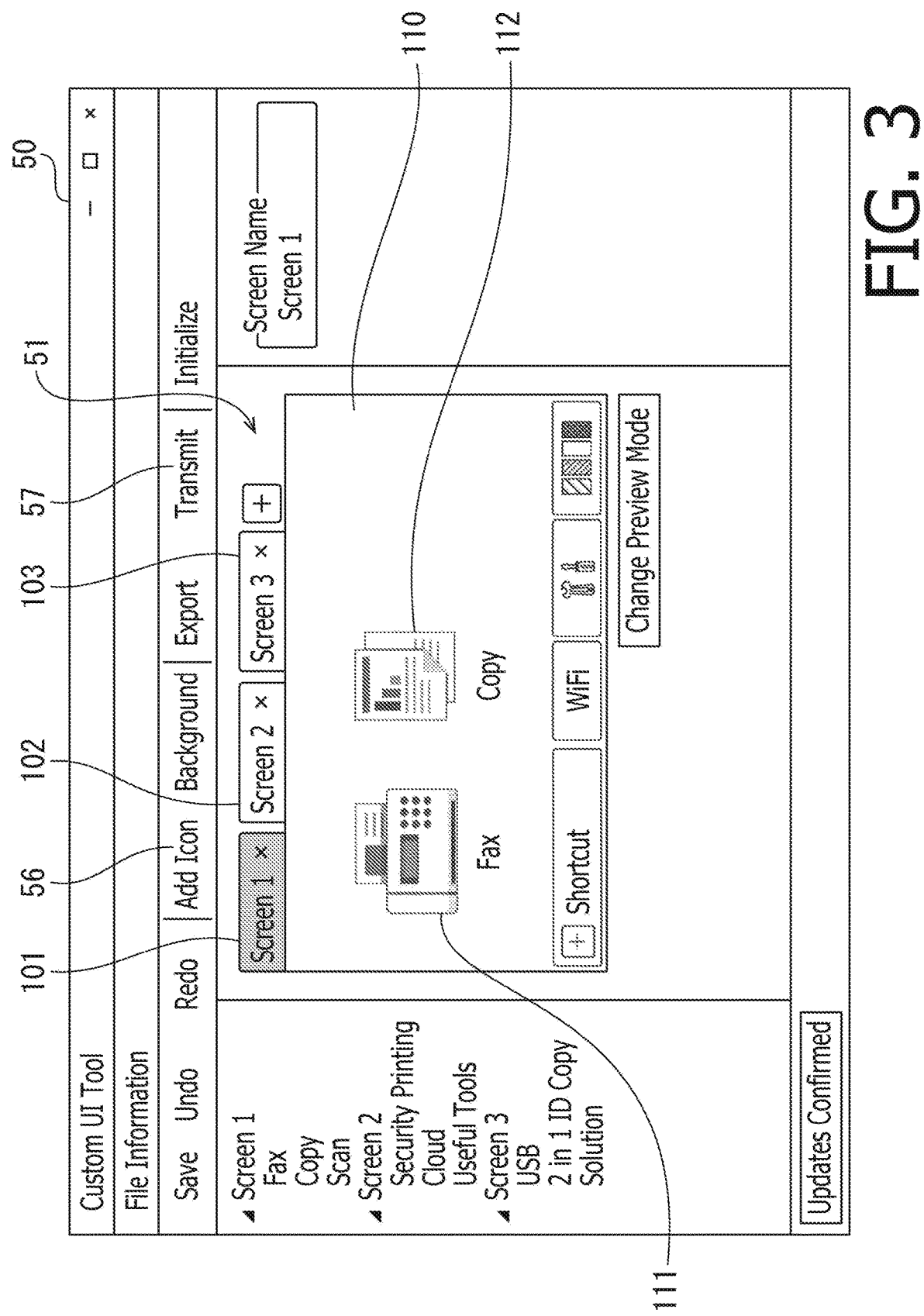

In the information processing device 30, when the screen creating program 45 is executed by the controller 41, a main screen 50 as shown in FIG. 3 is displayed on the display 34. The main screen 50 is used as a starting point in customizing the standby screen 100 to be displayed on the display 14 of the image processing apparatus 10.

As shown in FIG. 3, the main screen 50 includes a customizing screen 51. The customizing screen 51 is for showing the standby screen 100. Namely, the customizing screen 51 includes the plurality of tabs 101, 102, and 103 in the same manner as the standby screen 100. On the customizing screen 51 as well, for instance, when one of the tabs is tapped, the tapped tab is brought into a selected state, and a tab screen associated with the tab in the selected state is displayed.

FIG. 3 shows an example in which the tab 101 is in the selected state, and the tab screen 110 associated with the tab 101 is displayed on the customizing screen 51. Icons included in the tab screen 110 on the customizing screen 51 are the same as the icons included in the tab screen 110 on the standby screen 100 to be displayed on the display 14 of the image processing apparatus 10.

The information processing device 30 obtains screen data representing the standby screen 100, and causes the display 34 to display the customizing screen 51 having the same configuration as the standby screen 100 in accordance with the obtained screen data. Then, via the main screen 50 including the customizing screen 51, the information processing device 30 accepts user's customization of the customizing screen 51. The customization of the customizing screen 51 may include adding a new icon via a below-mentioned custom-function creating screen 60 (see FIG. 5). Then, the information processing device 30 generates screen data representing the customizing screen 51 as customized, and sends the generated screen data to the image processing apparatus 10.

In response to receiving the screen data from the information processing device 30, the image processing apparatus 10 updates the screen data stored therein by replacing the stored screen data with the received screen data. Then, the image processing apparatus 10 causes the display 14 to display the standby screen 100 based on the updated screen data. Thereby, the image processing apparatus 10 may cause the display 14 thereof to display the standby screen 100 customized on the information processing device 30.

It is noted that the customizing screen 51 may not necessarily be displayed based on the screen data received from the image processing apparatus 10, but may be displayed based on another piece of screen data obtained in a different way. For instance, the information processing device 30 may obtain screen data having a different screen configuration from the standby screen 100 currently displayed on the display 14 of the image processing apparatus 10, cause the display 34 to display, on the main screen 50, a customizing screen 51 based on the obtained screen data, and accept various customizing operations (e.g., adding or reducing tabs, adding or reducing icons, and editing icon data of each icon) to customize the customizing screen 51 with the displayed customizing screen 51 as a starting point for the customization. Then, the information processing device 30 may transmit screen data representing the customizing screen 51 customized by the accepted customizing operations, thereby updating the standby screen 100 on the display 14 of the image processing apparatus 10 in accordance with the transmitted screen data.

Figure 4:
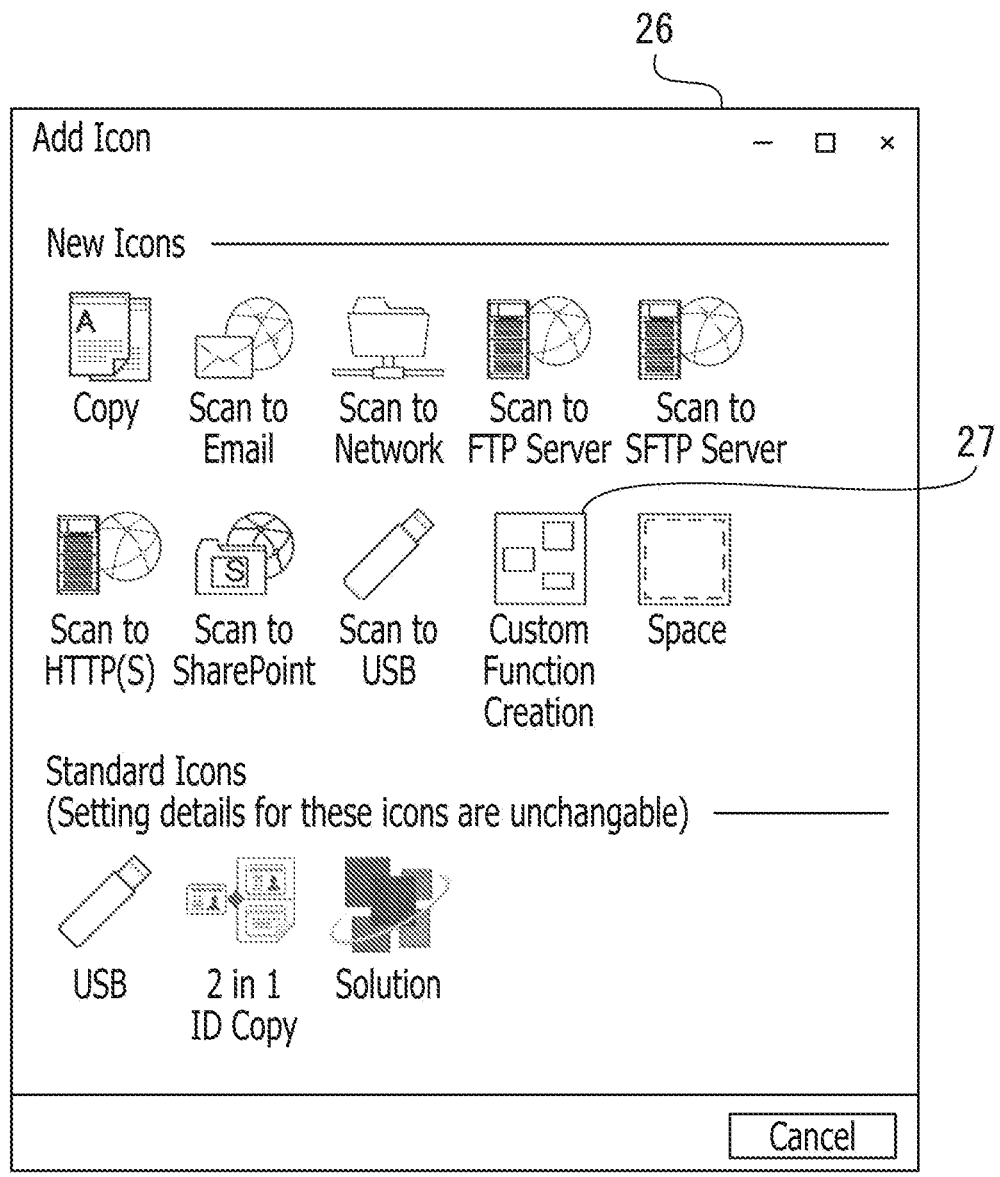

The main screen 50 includes an icon adding button 56 and a transmission button 57. The icon adding button 56 is configured to, when operated and selected, cause the display 34 to display an additional-icon selecting screen 26 (see FIG. 4) for adding a new icon onto the tab screen currently displayed on the customizing screen 51.

It is noted that an operation of selecting a specific one (e.g., the icon adding button 56) of selectable objects on a screen (e.g., the main screen 50) may be any type of operation. For instance, the operation of selecting the specific object may be tapping the specific object via the touch panel. Further, for instance, the operation of selecting the specific object may be clicking the mouse after operating the mouse thereby moving a pointer onto a position of the specific object on the screen.

The additional-icon selecting screen 26 includes a plurality of icons displayed thereon. The user may select an icon that the user wishes to add from among the plurality of icons. The plurality of icons includes a plurality of defined-function icons and a custom-function creating icon 27. The defined-function icons are associated with predefined functions, respectively. The custom-function creating icon 27 is for customizing a user-specific function.

Figure 5:
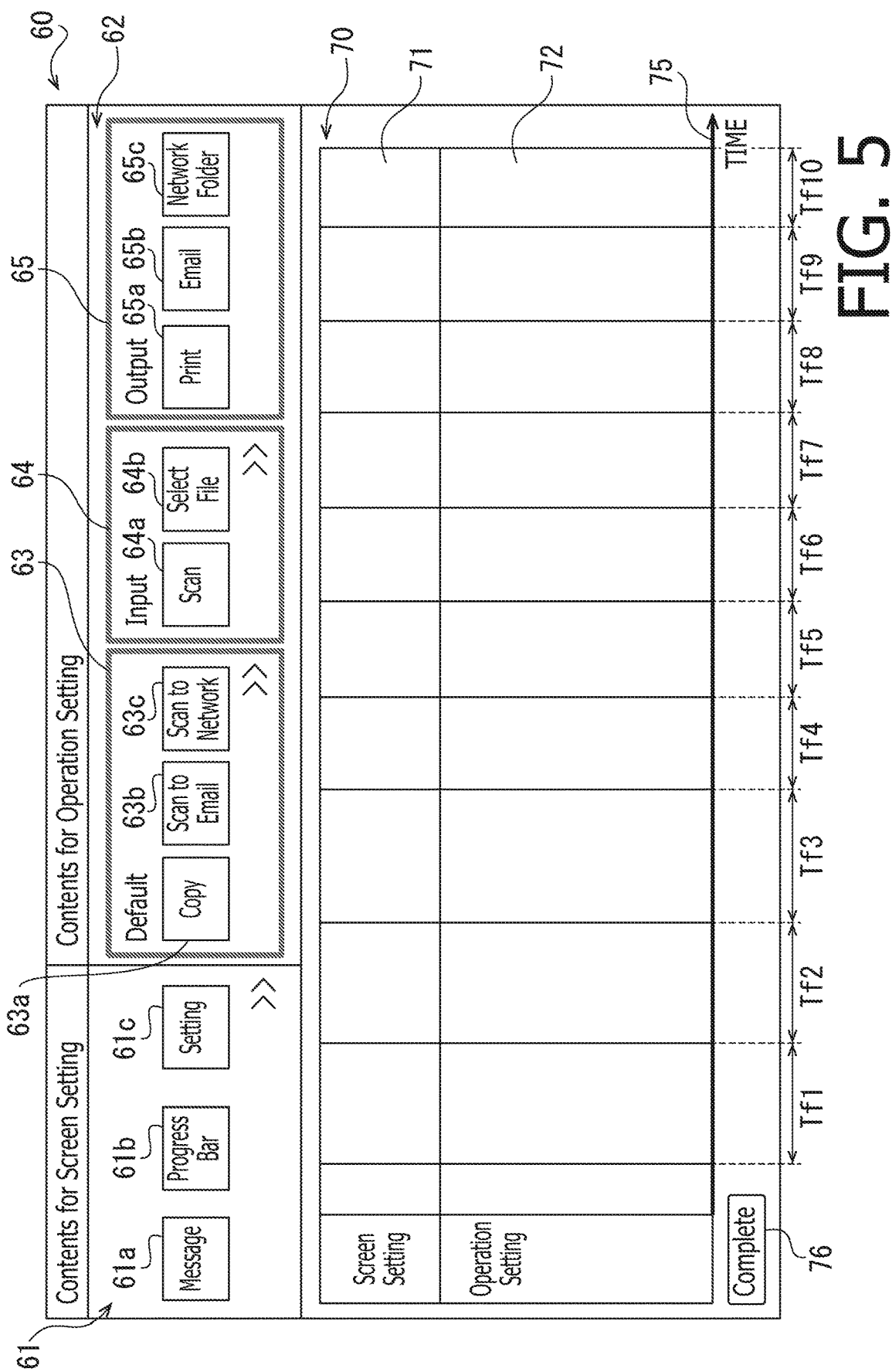

In response to the custom-function creating icon 27 being operated and selected, a custom-function creating screen 60 as shown in FIG. 5 is displayed. The custom-function creating screen 60 has a screen setting part area 61, an operation setting part area 62, and a setting frame 70.

The screen setting part area 61 includes one or more screen setting parts displayed therein. More specifically, in the illustrative embodiment, the screen setting part area 61 includes at least a message part 61a, a progress bar part 61b, and a setting part 61c as the screen setting parts.

Each of the screen setting parts is associated with a screen content that is information representing a screen to be displayed on the standby screen 100 on the display 14 of the image processing apparatus 10. The screen content associated with the message part 61a is configured to cause the standby screen 100 to display thereon a particular message. The screen content associated with the progress bar part 61b is configured to cause the standby screen 100 to display thereon a progress bar. A screen content associated with the setting part 61c is configured to cause the standby screen 100 to display thereon a setting screen for displaying and editing various setting values for an operation to be performed.

The operation setting part area 62 includes one or more operation setting parts displayed therein. In the illustrative embodiment, the operation setting part area 62 includes a default area 63, an input area 64, and an output area 65.

The input area 64 includes one or more input operation setting parts displayed therein. More specifically, in the illustrative embodiment, the input area 64 includes at least a scan part 64a and a select-file part 64b as the input operation setting parts.

Each of the input operation setting parts 64a and 64b is associated with an input operation content that is an operation content including an operation of obtaining data. The input operation content associated with the scan part 64a is configured to cause the image processing apparatus 10 to perform an operation of scanning an image of a document sheet. The input operation content associated with the select-file part 64b is configured to cause the image processing apparatus 10 to perform an operation of selecting a file stored in the storage 22.

The output area 65 includes one or more output operation setting parts displayed therein. More specifically, in the illustrative embodiment, the output area 65 includes at least a print part 65a, an Email part 65b, and a network folder part 65c as the output operation setting parts.

Each of the output operation setting parts 65a, 65b, and 65c is associated with an output operation content that is an operation content including an operation of outputting data. The output operation content associated with the print part 65a is configured to cause the image processing apparatus 10 to perform an operation of printing an image on a printing sheet. The output operation content associated with the Email part 65b is configured to cause the image processing apparatus 10 to perform an operation of transmitting an email or transmitting an email with a particular file attached thereto. The output operation content associated with the network folder part 65c is configured to cause the image processing apparatus 10 to perform an operation of transmitting a particular file to a particular information processing device connected with a network (e.g., the communication network 201).

The default area 63 includes one or more default operation setting parts displayed thereon. More specifically, in the illustrative embodiment, the default area 63 includes at least a copy part 63a, a Scan-to-Email part 63b, and a Scan-to-Network part 63c.

Each of the default operation setting parts 63a, 63b, and 63c is associated with a plurality of operation contents. In the illustrative embodiment, each default operation setting part is associated with at least one input operation content and at least one output operation content.

For instance, the copy part 63a is an operation setting part for causing the image processing apparatus 10 to perform a copying operation. The copying operation is a combined operation including a scanning operation to scan an image of a document sheet and a printing operation to print, on a printing sheet, the scanned image of the document sheet. Therefore, the copy part 63a is associated with the same input operation content as the scan part 64a and the same output operation content as the print part 65a.

It is noted that each operation setting part is associated with an operation content and a predetermined default screen setting content. The operation content and the image setting content may be expressed in any form. In the illustrative embodiment, for instance, the operation content and the image setting content are information written in the XML ("XML" is an abbreviation of "extensible markup language").

The setting frame 70 includes a screen setting area 71 and an operation setting area 72. The screen setting area 71 and the operation setting area 72 are disposed along a time line 75 sectioned into a plurality of time frames Tf1, Tf2, . . . , and are vertically arranged side by side.

The user may set an arbitrary setting part in an arbitrary time frame of the setting frame 70. Then, in response to a completion button 76 being operated and selected with one or more setting parts set in the setting frame 70, respective contents corresponding to the one or more setting parts set in the setting frame 70 are combined in the same order as the one or more setting parts are arranged along the time line 75. Thereby, a single piece of processing data is generated. In the illustrative embodiment, for instance, the generated processing data may be an XML file. The generated processing data is stored into the storage 42.

Figure 9:
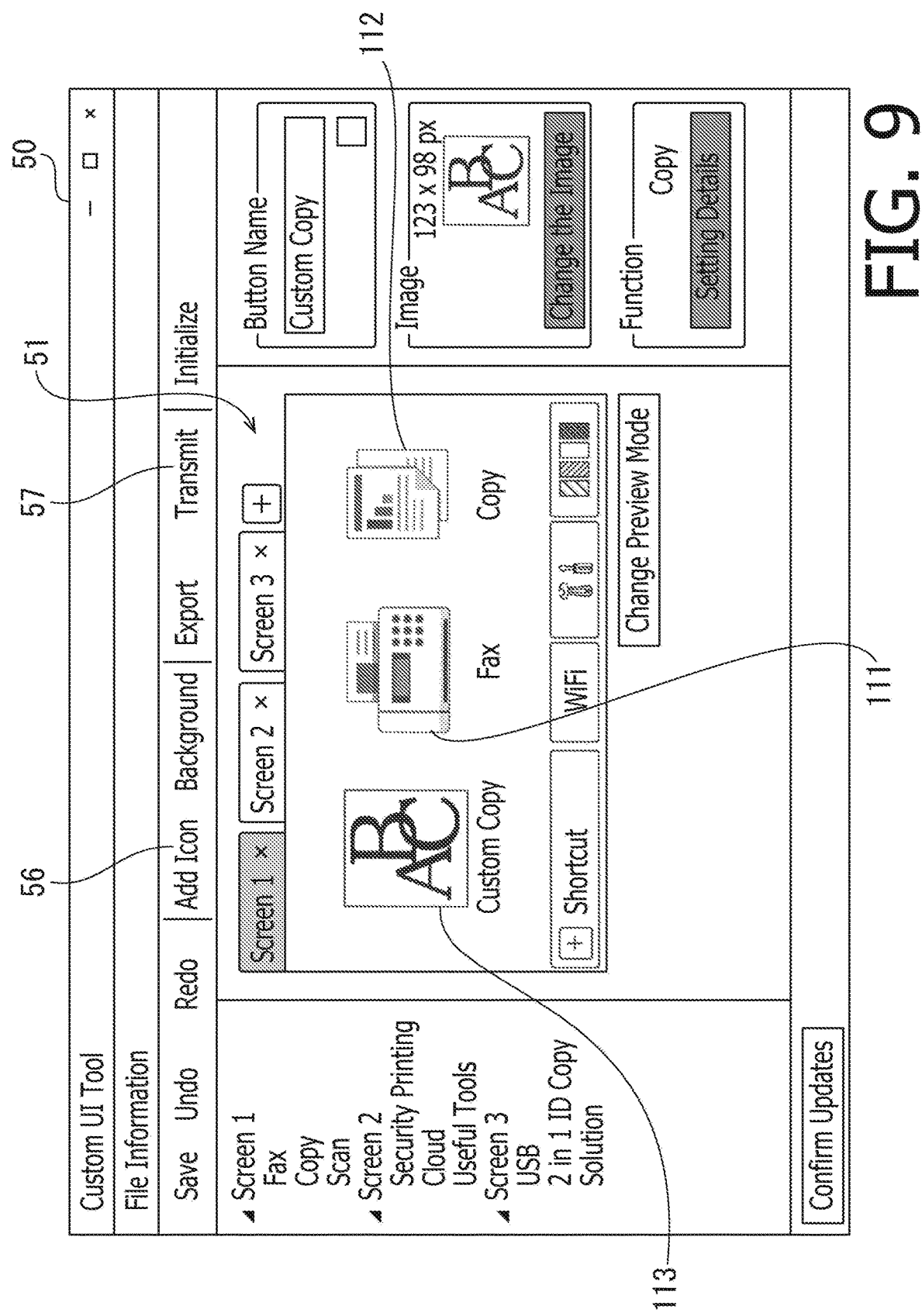
Figure 10:
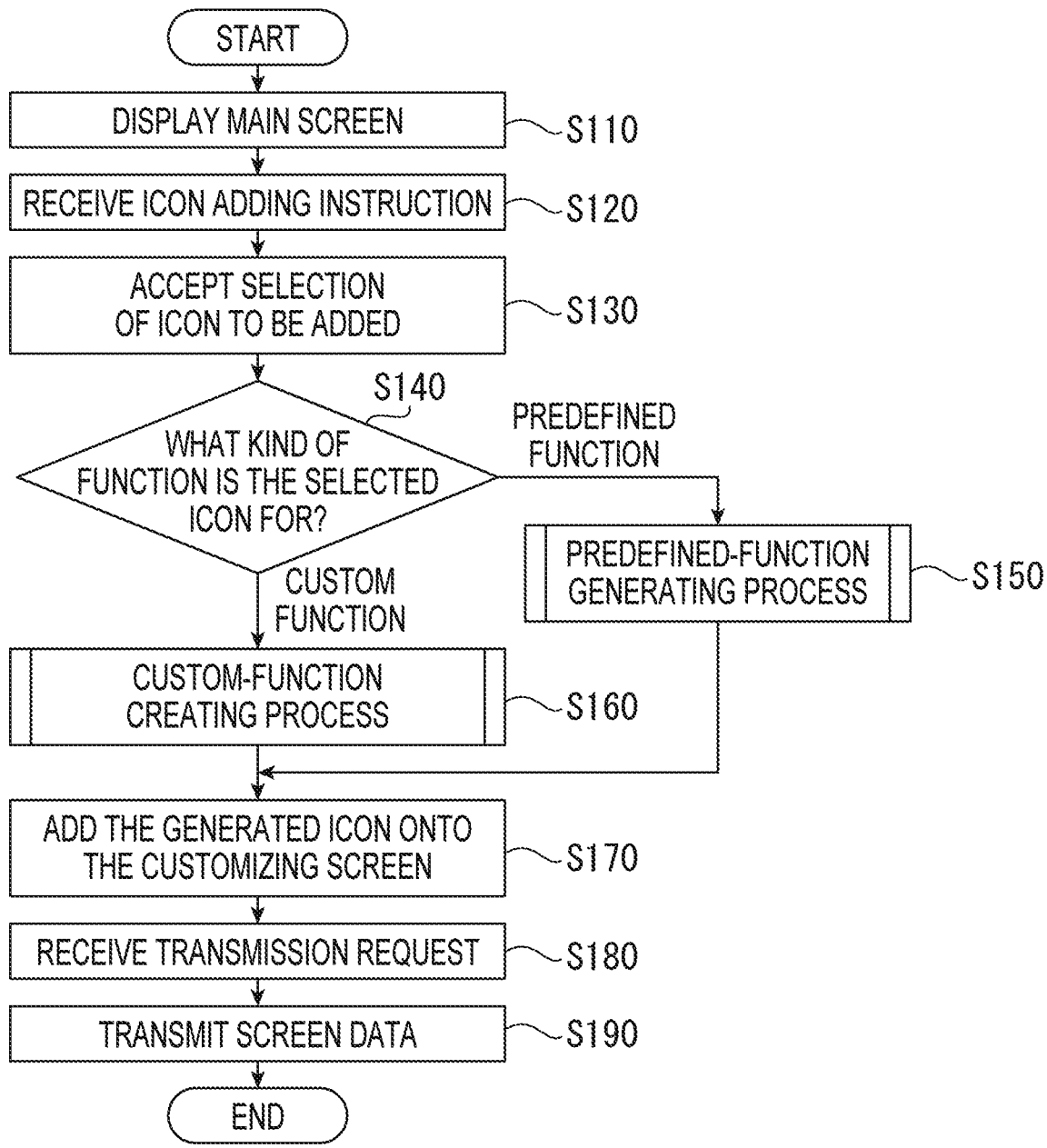
FIG. 10 is a flowchart showing a procedure of a screen customizing process to be executed by a controller of the information processing device, in the illustrative embodiment according to one or more aspects of the present disclosure.
Figure 11:
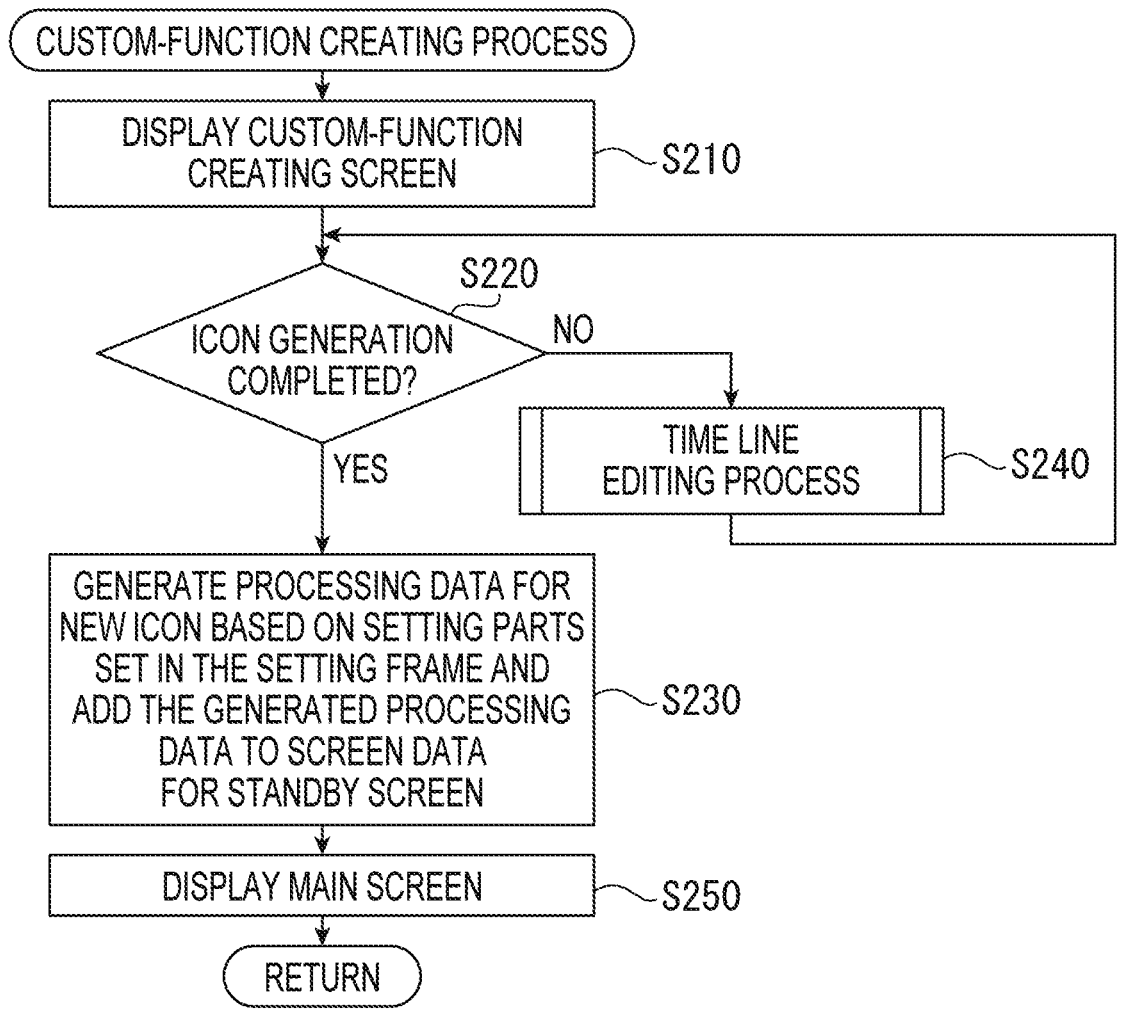
FIG. 11 is a flowchart showing a procedure of a custom-function creating process to be executed by the controller of the information processing device, in the illustrative embodiment according to one or more aspects of the present disclosure.
Figure 12:
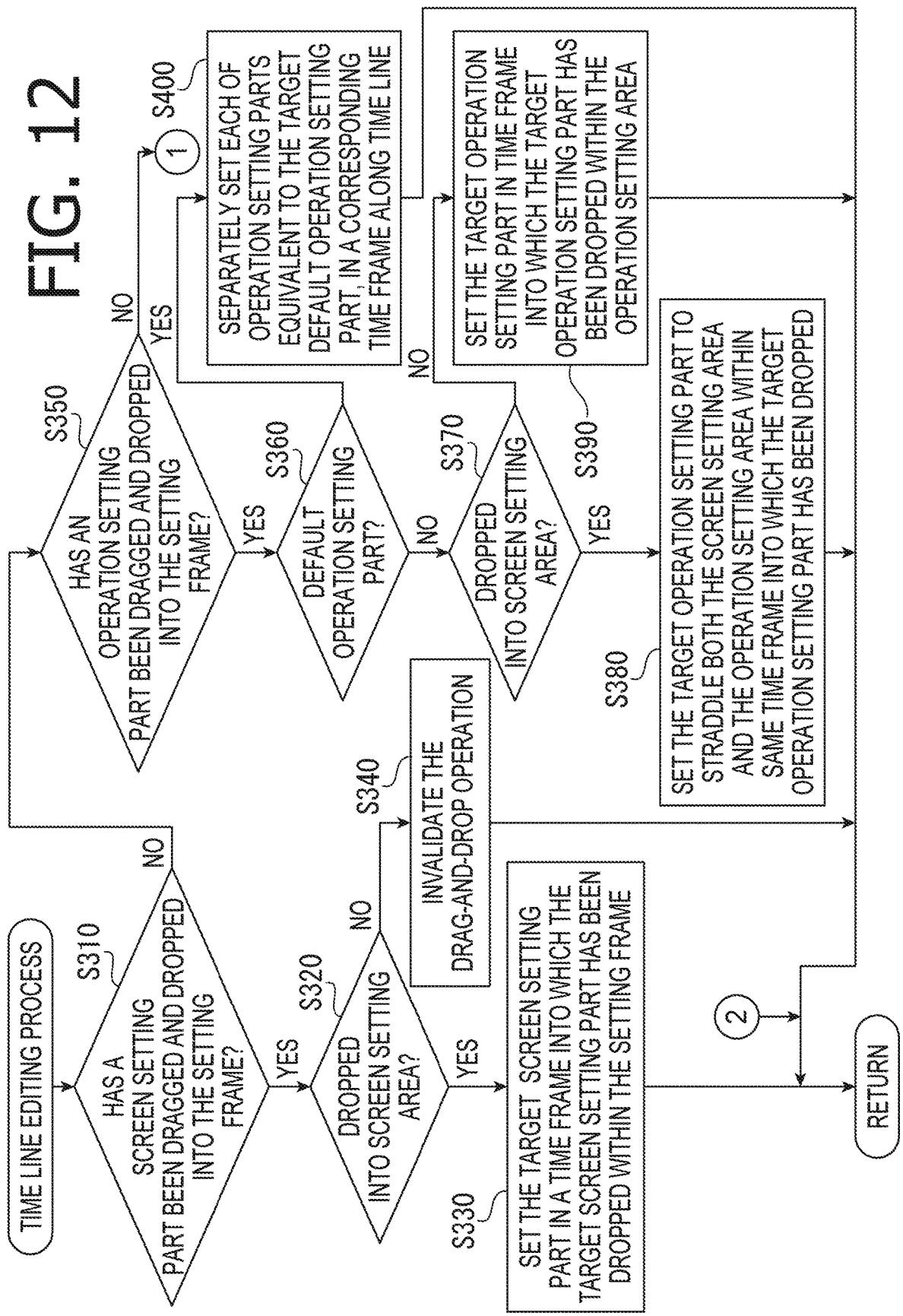
FIGS. 12 and 13 are flowcharts showing a procedure of a time line editing process to be executed by the controller of the information processing device, in the illustrative embodiment according to one or more aspects of the present disclosure.
Figure 13:
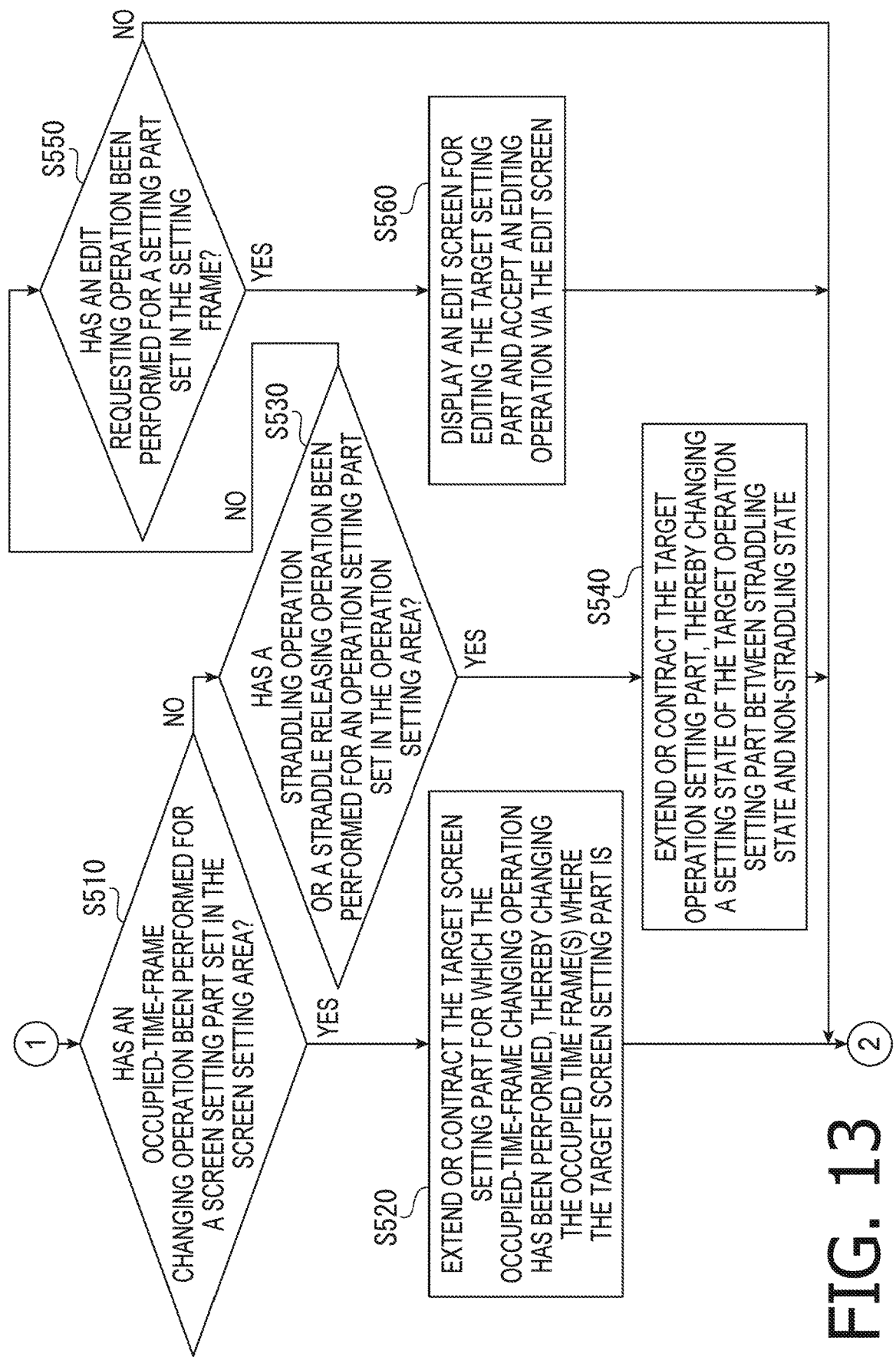

When processing data of a newly-created icon is generated, icon data, which includes the processing data and represents the new icon, is generated. Afterward, the main screen 50 is again displayed on the display 34. At this time, as exemplified in FIG. 9, a new icon 113 is added onto the main screen 50 based on the icon data generated via the custom-function creating screen 60.

The user may arbitrarily set a name and an image for the new icon 113. In response to the name and/or the image set for the new icon 113 being updated, image data included in the icon data is updated as well.

Then, in response to a transmission button 57 displayed on the main screen 50 being operated and selected, the screen data including the icon data of the new icon 113 is transmitted to the image processing apparatus 10. Thereby, the new icon 113, as generated by the screen creating program 45 on the information processing device 30, is displayed on the standby screen 100. Thereafter, in response to the new icon 113 being operated and selected on the standby screen 100, the one or more operations set in association with the new icon 113 are performed, and the one or more screens set in association with the new icon 113 are displayed, based on the corresponding processing data.

When a plurality of operation setting parts are set along the time line 75 in generating the processing data, respective operations corresponding to operation contents associated with the operation setting parts are sequentially performed in the same order as the operation setting parts are arranged along the time line 75. Further, when a plurality of screen setting parts are set along the time line 75, respective screens corresponding to screen contents associated with the screen setting parts are sequentially displayed in the same order as the screen setting parts are arranged along the time line 75.

In the setting frame 70, one or more screen setting parts and one or more operation setting parts may be individually set. Specifically, the user may set each individual setting part in one of the time frames included in the setting frame 70 by a drag-and-drop operation.

It is noted that the following conditions are required for setting each individual setting part in the setting frame 70. Specifically, each screen setting part needs to be set only in the screen setting area 71 of the setting frame 70. In this regard, however, two or more screen setting parts are not allowed to be set in a same time frame even within the screen setting area 71.

Figure 6:
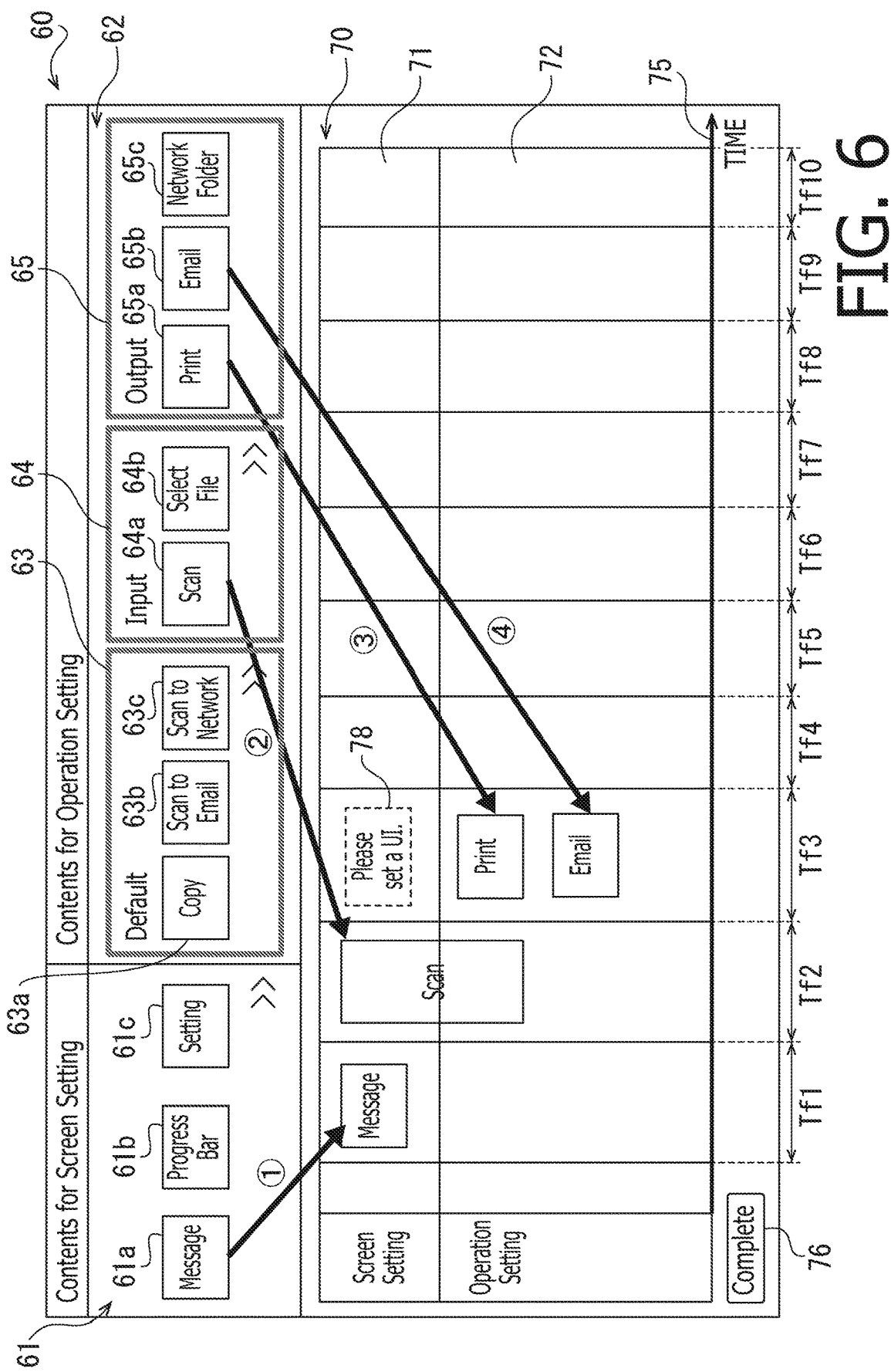

FIG. 6 exemplifies a state where the message part 61*a* as a screen setting part is set in the time frame Tf1 within the screen setting area 71 by a drag-and-drop operation.

Each operation setting part is allowed to be set in the operation setting area 72 of the setting frame 70. A plurality of operation setting parts, of which the number is equal to or less than a predefined number, is allowed to be set in a same time frame within the operation setting area 72. FIG. 6 exemplifies a state where two operation setting parts, i.e., the print part 65*a* and the Email part 65*b* are set in the same time frame Tf3 within the operation setting area 72.

Further, each operation setting part may be set to straddle both the screen setting area 71 and the operation setting area 72. Any operation setting part is not allowed to be set only in the screen setting area 71. However, when an operation setting part is dragged and dropped into the screen setting area 71, the operation setting part is automatically extended downward to straddle both the screen setting area 71 and the operation setting area 72.

FIG. 6 exemplifies a state where when the scan part 64*a* as an operation setting part is dragged and dropped into the time frame Tf2 within the screen setting area 71, the scan part 64*a* is automatically extended downward to straddle both the screen setting area 71 and the operation setting area 72 in the time frame Tf2.

Thus, in a time frame in which an operation setting part is set to straddle both the screen setting area 71 and the operation setting area 72, a default screen content associated with the operation setting part is used. Namely, while the scanning operation corresponding to the scan part 64*a* set in the time frame Tf2 is being performed by the image processing apparatus 10, a default screen, which is represented by a default screen content associated with the scan part 64*a*, is displayed on the display 14 of the image processing apparatus 10.

In a time frame in which an operation setting part is set, a screen setting part is also required to be set. More specifically, when an operation setting part is set in a time frame, it is required that a screen setting part is also set in the same time frame or that the same operation setting part is set to straddle both the screen setting area 71 and the operation setting area 72 in the same time frame.

When there is no setting part set in the screen setting area 71 in a time frame although an operation setting part is set in the operation setting area 72 in the same time frame, as exemplified in the time frame Tf3 in FIG. 6, a UI setting message 78 is displayed in the screen setting area 71 in the same time frame. Further, the completion button 76 is grayed out, thereby becoming unable to be operated or selected.

Further, the following pairing requirement is defined to set operation setting parts in the operation setting area 72. Specifically, an input operation setting part and an output operation setting part are required to be set as a pair in the operation setting area 72. In other words, when an input operation setting part is set in the operation setting area 72, the input operation setting part needs to be set to form an input-output pair with an output operation setting part. Likewise, when an output operation setting part is set in the operation setting area 72, the output operation setting part needs to be set to form an input-output pair with an input operation setting part.

When an input operation setting part or an output operation setting part is set in the operation setting area 72, the controller 41 determines whether the above pairing requirement is satisfied. In response to determining that the pairing requirement is not satisfied, the controller 41 grays out the completion button 76 to forbid the completion button 76 to be operated or selected. Namely, when the pairing requirement is not satisfied, it is impossible to complete creating a new icon.

Further, in response to a default operation setting part being dragged and dropped into the setting frame 70, the default operation setting part is automatically divided into an input operation setting part and an output operation setting part for each of a plurality of operation contents associated with the default operation setting part. These operation setting parts into which the default operation setting part is divided are equivalent to the default operation setting part before divided. Then, each of the operation setting parts generated by dividing the default operation setting part is separately set in a corresponding time frame in an execution sequence along the time line 75.

Figure 7:
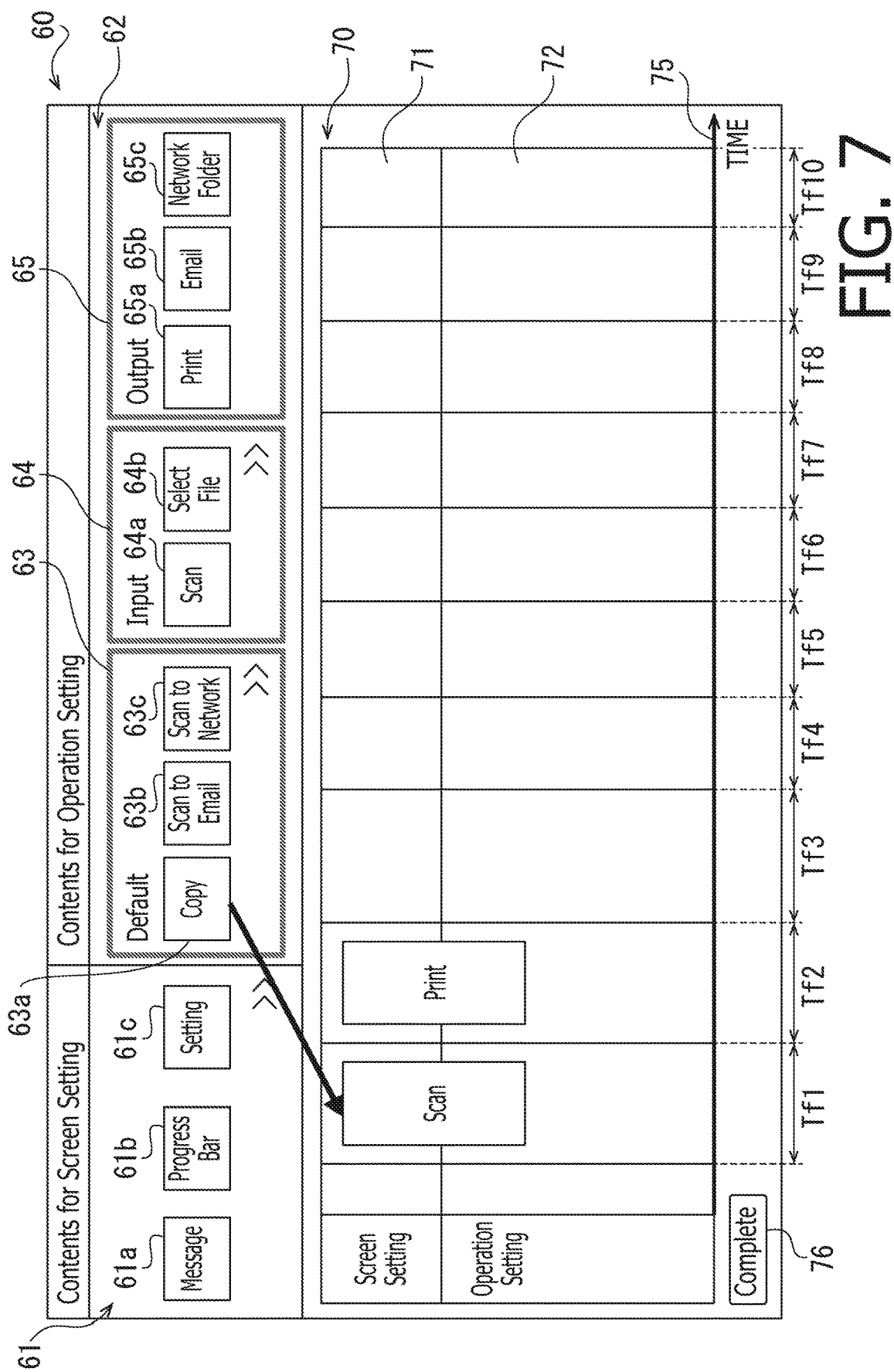

As shown in FIG. 7, suppose for instance that the copy part 63*a* as a default operation setting part is dragged and dropped into the time frame Tf1 within the operation setting area 72. The copy part 63*a* is associated with the specific operations contents, i.e., the scanning operation and the printing operation.

In this case, the copy part 63*a* is divided into the scan part 64*a* and the print part 65*a*. Then, the scan part 64*a* is set in the time frame Tf1 into which the copy part 63*a* has been dragged and dropped, and the print part 65*a* is set in the time frame Tf2 subsequent to the time frame Tf1. Thereby, an icon configured to, when operated and selected, cause the image processing apparatus 10 to first perform the scanning operation and then perform the printing operation (i.e., to perform the copy operation) is newly created.

Thus, the default operation setting parts, each of which is associated with a combination of respective operation contents of a plurality of operation setting parts, are previously prepared as operation setting parts. Hence, the user may easily create an icon associated with a combined operation including a plurality of operations.

Figure 8:
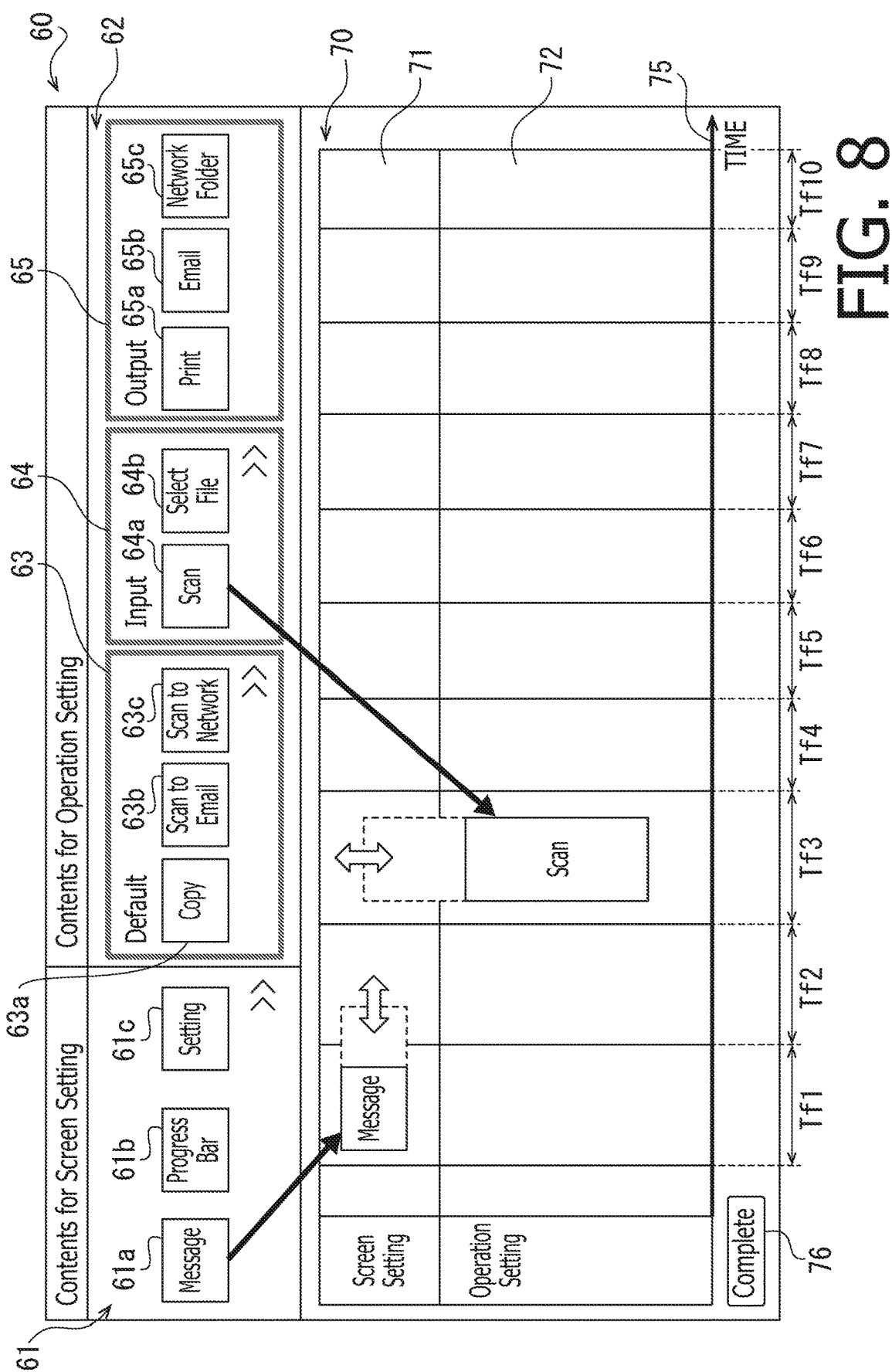

Further, each operation setting part is configured such that an upper side thereof is vertically dragged in the setting frame 70. For instance, as shown in FIG. 8, in response to the upper side of an operation setting part (e.g., the scan part 64a as exemplified) set in the time frame Tf3 within the operation setting area 72 being dragged upward, the operation setting part is extended upward, thereby being set to straddle both the screen setting area 71 and the operation setting area 72. Conversely, when an operation setting part is set to straddle both the screen setting area 71 and the operation setting area 72, in response to the upper side of the operation setting part being dragged downward, the operation setting part is shortened downward, thereby being placed only in the operation setting area 72.

Thus, the user may easily switch a setting state of an operation setting part between a state where the operation setting part is set only in the operation setting area 72 and a state where the operation setting part is set to straddle both the screen setting area 71 and the operation setting area 72. Further, each screen setting part is configured such that a left side or a right side thereof is dragged leftward and rightward in the screen setting area 71.

For instance, as shown in FIG. 8, in response to the right side of a screen setting part (e.g., the message part 61a as exemplified) set in the time frame Tf1 within the screen setting area 71 being dragged rightward, the screen setting part is extended rightward, thereby being set to straddle both of the time frames Tf1 and Tf2. In response to the right side of the screen setting part being dragged further rightward, the screen setting part may be set to straddle three or more time frames from the time frame Tf1 to the time frame Tf3 or a following time frame. Further, in response to the left side of the screen setting part being dragged leftward, the screen setting part may be set to straddle a plurality of time frames.

Conversely, when a screen setting part is set to straddle a particular number of time frames, in response to the right side of the screen setting part being dragged leftward, the screen setting part may be shortened leftward, thereby being set to straddle a reduced number of time frames. Further, in this case, in response to the left side of the screen setting part being dragged rightward, the screen setting part may be shortened rightward, thereby being set to straddle a reduced number of time frames.

Thus, the user may easily switch a setting state of a screen setting part between a state where the screen setting part is set only in a single time frame and a state where the screen setting part is set to straddle a plurality of time frames. Further, by performing a particular edit requesting operation (e.g., double click) for each setting part set in the setting frame 70, the user may edit a corresponding content.

For instance, when the user performs a particular edit requesting operation for a screen setting part, an edit screen for editing a corresponding screen content may be displayed, and the user may edit the corresponding screen content via the edit screen. For instance, the user may arbitrarily edit contents of a corresponding screen to be displayed on the display 14 of the image processing apparatus 10.

Further, for instance, when the user performs a particular edit requesting operation for an operation setting part, an edit screen for editing a corresponding operation content may be displayed, and the user may edit the corresponding operation content via the edit screen. For instance, the user may arbitrarily edit execution conditions for a corresponding operation to be performed by the image processing apparatus 10. Specifically, for instance, in an attempt to edit execution conditions for the scanning operation, the user may arbitrarily set various setting values such as a document size and a scanning resolution.

(5) Explanation of Screen Customizing Process

Various processes having the main screen 50 as a starting point thereof, as described above with reference to FIGS. 3 to 9, may be implemented by the controller 41 performing a screen customizing process shown in FIGS. 10 to 13. After activated, the controller 41 starts the screen customizing process in response to a particular execution-request operation for requesting the information processing device 30 (more specifically, the controller 41) to perform the screen customizing process being performed.

After starting the screen customizing process, in S110, the controller 41 controls the display 34 to display the main screen 50 (see FIG. 3). In S120, the controller 41 accepts an operation of selecting the icon adding button 56 on the main screen 50. Then, the controller 41 goes to S130.

In S130, the controller 41 accepts an operation of selecting an icon to be newly added. Specifically, in S130, the controller 41 controls the display 34 to display the additional-icon selecting screen 26 (see FIG. 4) and accepts an operation of selecting an additional icon via the additional-icon selecting screen 26. Afterward, the controller 41 goes to S140.

In S140, the controller 41 determines whether the selected icon is for a predefined function or a custom function. In the illustrative embodiment, the custom-function creating icon 27 is for a custom function. Each of the other selectable icons on the additional-icon selecting screen 26 is for a corresponding predefined function. Initially, the custom-function creating icon 27 for a custom function is not associated with any predefined functions. The user may set operations to be performed as a custom function, for the custom-function creating icon 27.

In response to an icon for a predefined function being operated and selected (S140: Predefined Function), the controller 41 performs a predefined-function generating process in S150. Specifically, in S150, the controller 41 generates a new icon for the predefined function associated with the selected icon. Afterward, the controller 41 goes to S170.

In response to the custom-function creating icon 27 being operated and selected, the controller 41 performs a custom-function creating process in S160. Thereafter, the controller 41 goes to S170. The custom-function creating process will be described in detail with reference to FIG. 11.

In the custom-function creating process, in S210, the controller 41 controls the display 34 to display the custom-function creating screen 60 (see FIG. 5). In S220, the controller 41 determines whether generation of a new icon has been completed. In response to the completion button 76 being operated and selected, the controller 41 determines that generation of a new icon has been completed (S220: Yes), and goes to S230.

In S230, the controller 41 generates processing data for the new icon, for instance, based on what types of setting parts are set in the setting frame 70 and which time frame each setting part is set in. Then, the controller 41 adds the generated processing data to the screen data for the standby screen 100. Thereafter, the controller 41 goes to S250, in which the controller 41 causes the display 34 to again display the main screen 50. Afterward, the controller 41 goes to S170 (see FIG. 10).

It is noted that in S230, the controller 41 generates the processing data such that in a time frame where a single operation setting part is set to straddle both the screen setting area 71 and the operation setting area 72, a default screen associated with the single operation setting part is displayed. Further, in S230, the controller 41 generates the processing data such that when a single screen setting part is set to straddle a plurality of time frames, a screen based on a screen content associated with the single screen setting part is displayed in the plurality of time frames.

In S220, when the completion button 76 is not selected, the controller 41 determines that generation of a new icon has not been completed (S220: No), and goes to S240. In S240, the controller 41 performs a time line editing process. The time line editing process will be described in detail with reference to FIG. 12.

In the time line editing process, first, the controller 41 determines whether a screen setting part has been dragged and dropped into the setting frame 70 (S310). In response to determining that a screen setting part has been dragged and dropped into the setting frame 70 (S310: Yes), the controller 41 goes to S320.

In S320, the controller 41 determines whether the screen setting part has been dragged and dropped into the screen setting area 71. In response to determining that the screen setting part has been dragged and dropped into the screen setting area 71 (S320: Yes), the controller 41 goes to S330. In S330, the controller 41 sets the dragged and dropped screen setting part in a time frame into which the screen setting part has been dropped within the screen setting area 71. Afterward, the controller 41 goes to S220 (see FIG. 11).

Meanwhile, in response to determining that the screen setting part has not been dragged or dropped into the screen setting area 71, i.e., that the screen setting part has been dragged and dropped into the operation setting area 71 (S320: No), the controller 41 goes to S340. In S340, the controller 41 invalidates the drag-and-drop operation. Thereafter, the controller 41 goes to S220 (see FIG. 11).

In response to determining that a screen setting part has not been dragged or dropped into the setting frame 70 (S310: No), the controller 41 goes to S350. In S350, the controller 41 determines whether an operation setting part has been dragged and dropped into the setting frame 70. In response to determining that an operation setting part has been dragged and dropped into the setting frame 70 (S350: Yes), the controller 41 goes to S360.

In S360, the controller 41 determines whether the dragged and dropped operation setting part is a default operation setting part. In response to determining that the dragged and dropped operation setting part is not a default operation setting part (S360: No), the controller 41 goes to S370. In S370, the controller 41 determines whether the operation setting part has been dragged and dropped into the screen setting area 71. In response to determining that the operation setting part has not been dragged and dropped into the screen setting area 71, i.e., that the operation setting part has been dragged and dropped into the operation setting area 72 (S370: No), the controller 41 goes to S390.

In S390, the controller 41 sets the dragged and dropped operation setting part in a time frame into which the operation setting part has been dropped within the operation setting area 72. Thereafter, the controller 41 goes to S220 (see FIG. 11).

In response to determining that the operation setting part has been dragged and dropped into the screen setting area 71 (S370: Yes), the controller 41 goes to S380. In S380, the controller 41 sets the dragged and dropped operation setting part to straddle both the screen setting area 71 and the operation setting area 72 within a same time frame into which the operation setting part has been dropped. Thereafter, the controller 41 goes to S220 (see FIG. 11).

In response to determining that the dragged and dropped operation setting part is a default operation setting part (S360: Yes), the controller 41 goes to S400. In S400, the controller 41 separately sets each of a plurality of operation setting parts (i.e., one or more input operation setting parts and one or more output operation setting parts) equivalent to the dragged and dropped default operation setting part, in a corresponding time frame along the time line 75. Afterward, the controller 41 goes to S220 (see FIG. 11).

In response to determining that an operation setting part has not been dragged or dropped into the setting frame 70 (S350: No), the controller 41 goes to S510 (see FIG. 13). In S510, the controller 41 determines whether an occupied-time-frame changing operation has been performed for a screen setting part set in the screen setting area 71. The occupied-time-frame changing operation is an operation of changing the time frame(s) in which a screen setting part is present. For instance, the occupied-time-frame changing operation may be an operation, as described above, of dragging the left side or the right side of a screen setting part leftward or rightward.

In response to determining that an occupied-time-frame changing operation has been performed for a screen setting part set in the screen setting area 71 (S510: Yes), the controller 41 goes to S520. In S520, the controller 41 extends or contracts the target screen setting part for which the occupied-time-frame changing operation has been performed, in accordance with the occupied-time-frame changing operation, thereby changing the occupied time frame(s) where the target screen setting part is. Thereafter, the controller 41 goes to S220 (see FIG. 11).

In response to determining that an occupied-time-frame changing operation has not been performed for a screen setting part set in the screen setting area 71 (S510: No), the controller 41 goes to S530. In S530, the controller 41 determines whether a straddling operation or a straddle releasing operation has been performed for an operation setting part set in the operation setting area 72.

The straddling operation is an operation of causing an operation setting part to straddle both the operation setting area 72 and the screen setting area 71. For instance, the straddling operation may be an operation, as described above, of dragging the upper side of an operation setting part upward.

The straddle releasing operation is an operation of causing an operation setting part, which is set to straddle both the operation setting area 72 and the screen setting area 71, to be placed only in the operation setting area 72. For instance, the straddle releasing operation may be an operation, as described above, of dragging the upper side of an operation setting part downward.

In response to determining that a straddling operation or a straddle releasing operation has been performed for an operation setting part set in the operation setting area 72 (S530: Yes), the controller 41 goes to S540. In S540, the controller 41 extends or contracts the target operation setting part in the vertical direction in accordance with the straddling operation or the straddle releasing operation as performed, thereby changing a setting state of the target operation setting part between a straddling state and a non-straddling state. It is noted that in the straddling state, the target operation setting part is set to straddle both the operation setting area 72 and the screen setting area 71. In the non-straddling state, the target operation setting part is placed only in the operation setting area 72. Following S540, the controller 41 goes to S220 (see FIG. 11).

In response to determining that a straddling operation or a straddle releasing operation has not been performed for an operation setting part set in the operation setting area 72 (S530: No), the controller 41 goes to S550. In S550, the controller 41 determines whether an edit requesting operation has been performed for a setting part set in the setting frame 70. In response to determining that an edit requesting operation has been performed for a setting part set in the setting frame 70 (S550: Yes), the controller 41 goes to S560. In S560, the controller 41 controls the display 34 to display an edit screen for editing the target setting part for which the edit requesting operation has been performed. Then, the controller 41 accepts, via the edit screen, an operation of editing a corresponding content associated with the target setting part, thereby updating the corresponding content. After S560, the controller 41 goes to S220 (see FIG. 11). Meanwhile, in response to determining that an edit requesting operation has not been performed for a setting part set in the setting frame 70 (S550: No), the controller 41 goes to S220 (see FIG. 11).

Referring back to FIG. 10, in S170, the controller 41 adds the new icon generated in S150 or S160 onto the customizing screen 51. When icon data for the new icon has been generated in S160, the new icon 113 (see FIG. 9) based on the generated icon data is added onto the customizing screen 51.

In S180, the controller 41 receives a transmission request. Specifically, in S180, the controller 41 accepts an operation of selecting the transmission button 57 via the main screen 50. In response to the transmission button 57 being operated and selected, the controller 41 goes to S190. In S190, the controller 41 transmits screen data including the icon data of the new icon 113 to the image processing apparatus 10.

(6) Advantageous Effects of Illustrative Embodiment

As described above, the illustrative embodiment may provide the following advantageous effects. In the illustrative embodiment, the information processing device 30 (more specifically, the controller 41) is configured to separately set one or more screen setting parts and one or more operation setting parts in arbitrary time frames within the setting frame 70. Thus, it is possible to set the one or more screen setting parts and the one or more operation setting parts with a high level of flexibility.

Then, the information processing device 30 generates processing data corresponding to each setting part set in the setting frame 70, and transmits icon data including the generated processing data to the image processing apparatus 10. Thereby, when a new icon represented by the icon data is selected on the image processing apparatus 10, the image processing apparatus 10 performs a corresponding content associated with each setting part, as set in the setting frame 70 in generating the new icon, along the time line 75.

Accordingly, the user may easily and flexibly customize operations to be executed by the image processing apparatus 10 and screens to be displayed during the execution of the operations, on the information processing device 30.

In addition, the user may separately set the operations to be executed by the image processing apparatus 10 and the screens to be displayed during the execution of the operations, along the time line 75 on the information processing device 30. Further, the user may set those operations and screens by simply dragging and dropping corresponding setting parts. Each setting part is set along the time line 75. Therefore, the user may easily recognize what kind of operations are set to be performed by the image processing apparatus 10, in what order each individual operation is set to be performed, and what kind of screen is set to be displayed while each individual operation is in execution. Thus, the user may easily and efficiently generate a new icon on the information processing device 30.

Further, the information processing device 30 is configured to set a plurality of operation setting parts in a same time frame within the operation setting area 72. Therefore, it is possible to customize an icon for causing the image processing apparatus 10 to perform a plurality of operations in parallel.

Further, each of the operation setting parts may be set to straddle both the operation setting area 72 and the screen setting area 71. Thereby, it is possible to cause the image processing apparatus 10 to display a corresponding default screen and to save an area for setting a screen setting part to cause the image processing apparatus 10 to display an equivalent screen. When determining that a corresponding default screen associated with a target operation setting part is sufficiently useful, the user may set the target operation setting part to straddle both the operation setting area 72 and the screen setting area 71, to efficiently generate a new icon.

Further, each of the screen setting parts may be extended and contracted along the time line 75. Thereby, the user may cause the image processing apparatus 10 to continuously display a same screen while sequentially performing a plurality of operations.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, the following modifications according to aspects of the present disclosure are feasible.

[Modifications]

When transmitting screen data to the image processing apparatus 10, the information processing device 30 may not necessarily transmit the whole screen data but may transmit partial data, including icon data of a new icon, of the screen data. For instance, the information processing device 30 may transmit only data of a tab screen onto which the new icon is added. Further for instance, the information processing device 30 may transmit only the icon data of the new icon.

A screen customizable by the screen creating program 45 is not limited to the standby screen 100. Various screens displayable on display apparatuses different from the display 14 of the image processing apparatus 10 may be customizable by the screen creating program 45.

In the aforementioned illustrative embodiment, the three types of selectable screen setting parts are exemplified. However, the types and/or the number of selectable screen setting parts may be appropriately determined as needed. The same may apply to the operation setting parts.

A plurality of functions executable by a single element exemplified in the aforementioned illustrative embodiment may be executed by a plurality of elements. Further, a single function of a single element exemplified in the aforementioned illustrative embodiment may be executed by a plurality of elements. Further, a plurality of functions of a plurality of elements exemplified in the aforementioned illustrative embodiment may be executed by a single element. Further, a single function achieved by a plurality of elements exemplified in the aforementioned illustrative embodiment may be achieved by a single element. A part of the elements and the configurations exemplified in the aforementioned illustrative embodiment may be omitted. Further, at least a part of the elements and the configurations exemplified in the aforementioned illustrative embodiment may be added to other modification according to aspects of the present disclosure, or may be replaced with elements and configurations of other modifications according to aspects of the present disclosure. Any aspects included in the technical concepts and the subject matters set forth in the following claims may be illustrative embodiments or modifications according to aspects of the present disclosure.

Associations between elements exemplified in the aforementioned illustrative embodiment and elements according to aspects of the present disclosure will be exemplified below. The storage 42 may be an example of a "non-transitory computer-readable medium" according to aspects of the present disclosure, and may be an example of a "memory" according to aspects of the present disclosure. The screen creating program 45 may be an example of "computer-readable instructions" according to aspects of the present disclosure, and may be an example of "processor-executable instructions" according to aspects of the present disclosure. The CPU 41A may be an example of a "processor" according to aspects of the present disclosure. The information processing device 30 may be an example of an "information processing device" according to aspects of the present disclosure. The display 34 may be an example of a "display" according to aspects of the present disclosure. The input I/F 35 may be an example of an "input interface" according to aspects of the present disclosure. The communication I/F 36 may be an example of a "communication interface" according to aspects of the present disclosure. The image processing apparatus 10 may be an example of a "display apparatus" according to aspects of the present disclosure. The standby screen 100 may be an example of an "icon screen" according to aspects of the present disclosure. The custom-function creating screen 60 may be an example of a "new-icon setting screen" according to aspects of the present disclosure. The controller 41 may be an example of a "controller" according to aspects of the present disclosure. The CPU 41A and the storage 42 may be included in the "controller" according to aspects of the present disclosure.

What is claimed is:

1. A non-transitory computer-readable medium storing computer-readable instructions that are executable by a processor coupled with an information processing device, the information processing device comprising a display, an input interface, and a communication interface configured to communicate with a display apparatus, the display apparatus being configured to:
   display an icon screen including one or more icons thereon, in accordance with icon data for each icon, each piece of icon data including image data representing a corresponding icon and processing data associated with the corresponding icon; and
   when an icon is selected from among the one or more icons on the icon screen, display one or more corresponding screens and perform one or more corresponding operations in accordance with the processing data associated with the selected icon,
the instructions being configured to, when executed by the processor, cause the processor to:
   accept, via the input interface, an icon adding operation to request adding a new icon onto the icon screen;
   in response to accepting the icon adding operation, control the display to display a new-icon setting screen, the new-icon setting screen including a setting frame, one or more screen setting parts, and one or more operation setting parts, the setting frame having a screen setting area and an operation setting area that extend along a time axis sectioned into a plurality of time frames, each screen setting part being associated with a screen content representing a specific screen that is set to be displayed on the display apparatus in response to the new icon being selected via the icon screen, each operation setting part being associated with an operation content representing a specific operation that is set to be performed on the display apparatus in response to the new icon being selected via the icon screen;
   accept, via the input interface, a screen-part setting operation of setting each of the one or more screen setting parts into a corresponding one of the time frames within the screen setting area;
   accept, via the input interface, an operation-part setting operation of setting each of the one or more operation setting parts into a corresponding one of the time frames within the operation setting area;
   generate specific processing data associated with the new icon, based on the screen content associated with each screen setting part set in the setting frame and on the operation content associated with each operation setting part set in the setting frame, the specific processing data being configured to, when the new icon is selected via the icon screen, cause the display apparatus to serially display each specific screen represented by the screen content associated with a corresponding one of the one or more screen setting parts in a same order as the one or more screen setting parts are arranged along the time axis while serially performing each specific operation represented by the operation content associated with a corresponding one of the one or more operation setting parts in a same order as the one or more operation setting parts are arranged along the time axis; and
   transmit specific icon data for the new icon to the display apparatus via the communication interface, the specific icon data including the specific processing data.

2. The non-transitory computer-readable medium according to claim 1, wherein the operation-part setting operation includes setting two or more different operation setting parts into a same time frame within the operation setting area.

3. The non-transitory computer-readable medium according to claim 1,
wherein the instructions are further configured to, when executed by the processor, cause the processor to:
accept, via the input interface, an operation of extending an operation setting part set in the operation setting area until the operation setting part straddles both the operation setting area and the screen setting area, the extended operation setting part being associated with a particular screen content representing a default screen; and
generate the specific processing data associated with the new icon, the specific processing data being further configured to, when the new icon is selected via the icon screen, cause the display apparatus to display the default screen based on the particular screen content associated with the extended operation setting part, in a time frame in which the extended operation setting part is set to straddle both the operation setting area and the screen setting area.

4. The non-transitory computer-readable medium according to claim 1,
wherein the instructions are further configured to, when executed by the processor, cause the processor to:
accept, via the input interface, an operation of extending a screen setting part set in a particular time frame within the screen setting area until the screen setting part straddles a plurality of time frames including the particular time frame, the extended screen setting part being associated with a particular screen content representing a particular screen; and
generate the specific processing data associated with the new icon, the specific processing data being further configured to, when the new icon is selected via the icon screen, cause the display apparatus to display the particular screen based on the particular screen content associated with the extended screen setting part, in the plurality of time frames which the extended screen setting part is set to straddle.

5. The non-transitory computer-readable medium according to claim 1,
wherein the instructions are further configured to, when executed by the processor, cause the processor to:
accept the operation-part setting operation via the input interface, the operation-part setting operation including setting an operation setting part into the operation setting area within a specific time frame in which no screen setting part is set; and
control the display to display a message requesting setting a screen setting part into the screen setting area within the specific time frame.

6. The non-transitory computer-readable medium according to claim 1,
wherein the instructions are further configured to, when executed by the processor, cause the processor to:
accept the operation-part setting operation of setting the one or more operation setting parts, via the input interface, the one or more operation setting parts including a combined operation setting part associated with a plurality of different operation contents; and
set a plurality of operation setting parts corresponding to the plurality of different operation contents into a plurality of time frames along the time axis, respectively.

7. The non-transitory computer-readable medium according to claim 1,
wherein the instructions are further configured to, when executed by the processor, cause the processor to:
accept the operation-part setting operation of setting the one or more operation setting parts, via the input interface, the one or more operation setting parts including at least one of a first operation setting part and a second operation setting part, the first operation setting part being associated with an operation content representing an operation to request data input into the display apparatus, the second operation setting part being associated with an operation content representing a particular output operation;
in response to accepting the operation-part setting operation, determine whether a pairing requirement is satisfied, the pairing requirement being satisfied when an appropriate pair of the first operation setting part and the second operation setting part is set in the setting frame; and
in response to determining that the pairing requirement is satisfied, generate the specific processing data associated with the new icon.

8. The non-transitory computer-readable medium according to claim 1,
wherein the instructions are further configured to, when executed by the processor, cause the processor to:
in response to a screen setting part set in the screen setting area being selected via the input interface, accept, via the input interface, a screen-content editing operation of editing a specific screen content associated with the selected screen setting part, and update the specific screen content in accordance with the accepted screen-content editing operation; and
in response to an operation setting part set in the operation setting area being selected via the input interface, accept, via the input interface, an operation-content editing operation of editing a specific operation content associated with the selected operation setting part, and update the specific operation content in accordance with the accepted operation-content editing operation.

9. An information processing device comprising:
a display;
an input interface;
a communication interface configured to communicate with a display apparatus, the display apparatus being configured to:
display an icon screen including one or more icons thereon, in accordance with icon data for each icon, each piece of icon data including image data representing a corresponding icon and processing data associated with the corresponding icon; and
when an icon is selected from among the one or more icons on the icon screen, display one or more corresponding screens and perform one or more corresponding operations in accordance with the processing data associated with the selected icon; and
a controller configured to perform a control process comprising:
accepting, via the input interface, an icon adding operation to request adding a new icon onto the icon screen;

in response to accepting the icon adding operation, controlling the display to display a new-icon setting screen, the new-icon setting screen including a setting frame, one or more screen setting parts, and one or more operation setting parts, the setting frame having a screen setting area and an operation setting area that extend along a time axis sectioned into a plurality of time frames, each screen setting part being associated with a screen content representing a specific screen that is set to be displayed on the display apparatus in response to the new icon being selected via the icon screen, each operation setting part being associated with an operation content representing a specific operation that is set to be performed on the display apparatus in response to the new icon being selected via the icon screen;

accepting, via the input interface, a screen-part setting operation of setting each of the one or more screen setting parts into a corresponding one of the time frames within the screen setting area;

accepting, via the input interface, an operation-part setting operation of setting each of the one or more operation setting parts into a corresponding one of the time frames within the operation setting area;

generating specific processing data associated with the new icon, based on the screen content associated with each screen setting part set in the setting frame and on the operation content associated with each operation setting part set in the setting frame, the specific processing data being configured to, when the new icon is selected via the icon screen, cause the display apparatus to serially display each specific screen represented by the screen content associated with a corresponding one of the one or more screen setting parts in a same order as the one or more screen setting parts are arranged along the time axis while serially performing each specific operation represented by the operation content associated with a corresponding one of the one or more operation setting parts in a same order as the one or more operation setting parts are arranged along the time axis; and transmitting specific icon data for the new icon to the display apparatus via the communication interface, the specific icon data including the specific processing data.

10. The information processing device according to claim 9,
wherein the controller comprises:
a processor; and
a memory storing processor-executable instructions configured to, when executed by the processor, cause the processor to perform the control process.

11. A method implementable on a processor coupled with an information processing device, the information processing device comprising a display, an input interface, and a communication interface configured to communicate with a display apparatus, the display apparatus being configured to:
display an icon screen including one or more icons thereon, in accordance with icon data for each icon, each piece of icon data including image data representing a corresponding icon and processing data associated with the corresponding icon; and when an icon is selected from among the one or more icons on the icon screen, display one or more corresponding screens and perform one or more corresponding operations in accordance with the processing data associated with the selected icon, the method comprising:
accepting, via the input interface, an icon adding operation to request adding a new icon onto the icon screen;

in response to accepting the icon adding operation, controlling the display to display a new-icon setting screen, the new-icon setting screen including a setting frame, one or more screen setting parts, and one or more operation setting parts, the setting frame having a screen setting area and an operation setting area that extend along a time axis sectioned into a plurality of time frames, each screen setting part being associated with a screen content representing a specific screen that is set to be displayed on the display apparatus in response to the new icon being selected via the icon screen, each operation setting part being associated with an operation content representing a specific operation that is set to be performed on the display apparatus in response to the new icon being selected via the icon screen;

accepting, via the input interface, a screen-part setting operation of setting each of the one or more screen setting parts into a corresponding one of the time frames within the screen setting area;

accepting, via the input interface, an operation-part setting operation of setting each of the one or more operation setting parts into a corresponding one of the time frames within the operation setting area;

generating specific processing data associated with the new icon, based on the screen content associated with each screen setting part set in the setting frame and on the operation content associated with each operation setting part set in the setting frame, the specific processing data being configured to, when the new icon is selected via the icon screen, cause the display apparatus to serially display each specific screen represented by the screen content associated with a corresponding one of the one or more screen setting parts in a same order as the one or more screen setting parts are arranged along the time axis while serially performing each specific operation represented by the operation content associated with a corresponding one of the one or more operation setting parts in a same order as the one or more operation setting parts are arranged along the time axis; and transmitting specific icon data for the new icon to the display apparatus via the communication interface, the specific icon data including the specific processing data.

* * * * *